United States Patent
Ichii

(10) Patent No.: US 8,018,637 B2
(45) Date of Patent: Sep. 13, 2011

(54) OPTICAL SCANNING APPARATUS AND IMAGE FORMING APPARATUS

(75) Inventor: Daisuke Ichii, Kanagawa (JP)

(73) Assignee: Ricoh Company, Limited, Tokyo (JP)

(*) Notice: Subject to any disclaimer, the term of this patent is extended or adjusted under 35 U.S.C. 154(b) by 902 days.

(21) Appl. No.: 11/712,400

(22) Filed: Mar. 1, 2007

(65) Prior Publication Data
US 2007/0211325 A1 Sep. 13, 2007

(30) Foreign Application Priority Data
Mar. 6, 2006 (JP) ................................. 2006-059232

(51) Int. Cl.
*G02B 26/08* (2006.01)
(52) U.S. Cl. ............... 359/205.1; 359/207.2; 359/207.3
(58) Field of Classification Search ..... 359/205.1–208.2
See application file for complete search history.

(56) References Cited

U.S. PATENT DOCUMENTS

| 6,359,717 | B2 * | 3/2002 | Suzuki et al. | 359/205.1 |
| 2004/0125193 | A1 * | 7/2004 | Kubo | 347/233 |
| 2006/0209375 | A1 * | 9/2006 | Serizawa | 359/205 |
| 2006/0285187 | A1 | 12/2006 | Ichii | |

FOREIGN PATENT DOCUMENTS

| JP | 2002-131674 | 5/2002 |
| JP | 2004-109761 | 4/2004 |
| JP | 2004-287380 | 10/2004 |
| JP | 2005-062834 | 3/2005 |

* cited by examiner

*Primary Examiner* — James Phan
(74) *Attorney, Agent, or Firm* — Harness, Dickey & Pierce, P.L.C.

(57) ABSTRACT

A second scanning lens has a refracting power in a sub-scanning direction, and an optical element-deforming unit that changes a position of the center of curvature of the second scanning lens in the sub-scanning direction to a direction substantially parallel to the sub-scanning direction. Further, a function $Cs(y)$ of a curvature in the sub-scanning direction of the scanning lens deformed by the optical element-deforming unit in the scanning lens is set to have only one extreme value within a mirror surface region on a first surface of the lens.

20 Claims, 19 Drawing Sheets

FIG. 2

| FIRST SURFACE OF SCANNING LENS L1 | | | |
|---|---|---|---|
| MAIN SCANNING DIRECTION | | SUB-SCANNING DIRECTION | |
| $1/C_{m0}$ | -1.21E+02 | $R_{s0}$ | -1.20E+02 |
| $a_{00}$ | 0.00E+00 | $b_{02}$ | 1.95E-06 |
| $a_{04}$ | 1.62E-07 | $b_{04}$ | 1.85E-09 |
| $a_{06}$ | -7.55E-10 | | |
| $a_{08}$ | 5.46E-13 | | |
| $a_{10}$ | -1.25E-16 | | |
| $a_{12}$ | 4.50E-21 | | |
| SECOND SURFACE OF SCANNING LENS L1 | | | |
| MAIN SCANNING DIRECTION | | SUB-SCANNING DIRECTION | |
| $1/C_{m0}$ | -6.20E+01 | $R_{s0}$ | -1.36E+02 |
| $a_{00}$ | 0.00E+00 | $b_{01}$ | 1.09E-05 |
| $a_{04}$ | 3.93E-07 | $b_{02}$ | -2.30E-06 |
| $a_{06}$ | -3.54E-10 | $b_{03}$ | -1.36E-08 |
| $a_{08}$ | -1.68E-14 | $b_{04}$ | 2.18E-09 |
| $a_{10}$ | 1.07E-16 | $b_{05}$ | 9.87E-12 |
| $a_{12}$ | -1.52E-20 | | |
| FIRST SURFACE OF SCANNING LENS L2 | | | |
| MAIN SCANNING DIRECTION | | SUB-SCANNING DIRECTION | |
| $1/C_{m0}$ | -5.00E+03 | $R_{s0}$ | -8.02E+01 |
| $a_{00}$ | 0.00E+00 | $b_{01}$ | – |
| $a_{04}$ | 1.72E-08 | $b_{02}$ | 2.13E-06 |
| $a_{06}$ | -3.12E-12 | $b_{03}$ | – |
| $a_{08}$ | -1.04E-16 | $b_{04}$ | – |
| $a_{10}$ | -9.28E-22 | $b_{06}$ | – |
| | | $b_{08}$ | – |
| SECOND SURFACE OF SCANNING LENS L2 | | | |
| MAIN SCANNING DIRECTION | | SUB-SCANNING DIRECTION | |
| $1/C_{m0}$ | 1.22E+03 | $R_{s0}$ | -2.64E+01 |
| $a_{00}$ | 0.00E+00 | $b_{01}$ | 6.15E-07 |
| $a_{04}$ | -9.27E-08 | $b_{02}$ | 3.04E-06 |
| $a_{06}$ | 4.98E-12 | $b_{03}$ | -1.11E-09 |
| $a_{08}$ | -7.00E-16 | $b_{04}$ | -1.18E-10 |
| $a_{10}$ | 3.04E-20 | $b_{05}$ | 3.25E-13 |
| $a_{12}$ | -1.13E-24 | $b_{06}$ | -8.29E-16 |
| | | $b_{07}$ | -4.08E-17 |
| | | $b_{08}$ | 1.56E-18 |
| | | $b_{09}$ | 1.82E-21 |
| | | $b_{10}$ | -1.02E-22 |

FIG. 5

| FIRST SURFACE OF SCANNING LENS L1 | | | |
|---|---|---|---|
| MAIN SCANNING DIRECTION | | SUB-SCANNING DIRECTION | |
| $1/C_{m0}$ | -1.21E+02 | $R_{s0}$ | -1.20E+02 |
| $a_{00}$ | 0.00E+00 | $b_{02}$ | 1.95E-06 |
| $a_{04}$ | 1.62E-07 | $b_{04}$ | 1.85E-09 |
| $a_{06}$ | -7.55E-10 | | |
| $a_{08}$ | 5.46E-13 | | |
| $a_{10}$ | -1.25E-16 | | |
| $a_{12}$ | 4.50E-21 | | |
| SECOND SURFACE OF SCANNING LENS L1 | | | |
| MAIN SCANNING DIRECTION | | SUB-SCANNING DIRECTION | |
| $1/C_{m0}$ | -6.20E+01 | $R_{s0}$ | -1.36E+02 |
| $a_{00}$ | 0.00E+00 | $b_{01}$ | 1.09E-05 |
| $a_{04}$ | 3.93E-07 | $b_{02}$ | -2.30E-06 |
| $a_{06}$ | -3.54E-10 | $b_{03}$ | -1.36E-08 |
| $a_{08}$ | -1.68E-14 | $b_{04}$ | 2.18E-09 |
| $a_{10}$ | 1.07E-16 | $b_{05}$ | 9.87E-12 |
| $a_{12}$ | -1.52E-20 | | |
| FIRST SURFACE OF SCANNING LENS L2 | | | |
| MAIN SCANNING DIRECTION | | SUB-SCANNING DIRECTION | |
| $1/C_{m0}$ | -5.00E+03 | $R_{s0}$ | -8.02E+01 |
| $a_{00}$ | 0.00E+00 | $b_{01}$ | -5.50E-06 |
| $a_{04}$ | 1.72E-08 | $b_{02}$ | 9.81E-07 |
| $a_{06}$ | -3.12E-12 | $b_{03}$ | -5.42E-10 |
| $a_{08}$ | -1.04E-16 | $b_{04}$ | 7.60E-11 |
| $a_{10}$ | -9.28E-22 | $b_{06}$ | -4.11E-15 |
| | | $b_{08}$ | -2.40E-18 |
| | | $b_{10}$ | -7.29E-23 |
| SECOND SURFACE OF SCANNING LENS L2 | | | |
| MAIN SCANNING DIRECTION | | SUB-SCANNING DIRECTION | |
| $1/C_{m0}$ | 1.22E+03 | $R_{s0}$ | -2.64E+01 |
| $a_{00}$ | 0.00E+00 | $b_{01}$ | -5.37E-06 |
| $a_{04}$ | -9.27E-08 | $b_{02}$ | 20.9E-06 |
| $a_{06}$ | 4.98E-12 | $b_{03}$ | -5.68E-10 |
| $a_{08}$ | -7.00E-16 | $b_{04}$ | -1.02E-10 |
| $a_{10}$ | 3.04E-20 | $b_{05}$ | -7.48E-15 |
| $a_{12}$ | -1.13E-24 | $b_{06}$ | 5.74E-15 |
| | | $b_{08}$ | -9.40E-19 |
| | | $b_{10}$ | -2.20E-22 |

FIG. 10

| FIRST SURFACE OF SCANNING LENS L1 | | | |
|---|---|---|---|
| MAIN SCANNING DIRECTION | | SUB-SCANNING DIRECTION | |
| $1/C_{m0}$ | -1.21E+02 | $R_{s0}$ | -1.20E+02 |
| $a_{00}$ | 0.00E+00 | $b_{02}$ | 1.95E-06 |
| $a_{04}$ | 1.62E-07 | $b_{04}$ | 1.85E-09 |
| $a_{06}$ | -7.55E-10 | | |
| $a_{08}$ | 5.46E-13 | | |
| $a_{10}$ | -1.25E-16 | | |
| $a_{12}$ | 4.50E-21 | | |
| SECOND SURFACE OF SCANNING LENS L1 | | | |
| MAIN SCANNING DIRECTION | | SUB-SCANNING DIRECTION | |
| $1/C_{m0}$ | -6.20E+01 | $R_{s0}$ | -1.36E+02 |
| $a_{00}$ | 0.00E+00 | $b_{01}$ | 1.09E-05 |
| $a_{04}$ | 3.93E-07 | $b_{02}$ | -2.30E-06 |
| $a_{06}$ | -3.54E-10 | $b_{03}$ | -1.36E-08 |
| $a_{08}$ | -1.68E-14 | $b_{04}$ | 2.18E-09 |
| $a_{10}$ | 1.07E-16 | $b_{05}$ | 9.87E-12 |
| $a_{12}$ | -1.52E-20 | | |
| FIRST SURFACE OF SCANNING LENS L2 | | | |
| MAIN SCANNING DIRECTION | | SUB-SCANNING DIRECTION | |
| $1/C_{m0}$ | -5.00E+03 | $R_{s0}$ | -8.02E+01 |
| $a_{00}$ | 0.00E+00 | $b_{02}$ | 1.77E-07 |
| $a_{04}$ | 1.72E-08 | $b_{04}$ | 1.32E-10 |
| $a_{06}$ | -3.12E-12 | $b_{06}$ | -1.08E-14 |
| $a_{08}$ | -1.04E-16 | $b_{08}$ | -1.47E-18 |
| $a_{10}$ | -9.28E-22 | $b_{10}$ | 6.49E-24 |
| SECOND SURFACE OF SCANNING LENS L2 | | | |
| MAIN SCANNING DIRECTION | | SUB-SCANNING DIRECTION | |
| $1/C_{m0}$ | 1.22E+03 | $R_{s0}$ | -2.64E+01 |
| $a_{00}$ | 0.00E+00 | $b_{01}$ | -2.73E-07 |
| $a_{04}$ | -9.27E-08 | $b_{02}$ | 1.37E-06 |
| $a_{06}$ | 4.98E-12 | $b_{03}$ | -1.76E-10 |
| $a_{08}$ | -7.00E-16 | $b_{04}$ | -6.03E-11 |
| $a_{10}$ | 3.04E-20 | $b_{05}$ | 2.01E-14 |
| $a_{12}$ | -1.13E-24 | $b_{06}$ | 4.55E-15 |
| | | $b_{07}$ | -1.17E-18 |
| | | $b_{08}$ | -1.45E-18 |
| | | $b_{09}$ | 2.02E-23 |
| | | $b_{10}$ | -5.43E-23 |

FIG. 13

| FIRST SURFACE OF SCANNING LENS L1 | | | |
|---|---|---|---|
| MAIN SCANNING DIRECTION | | SUB-SCANNING DIRECTION | |
| $1/C_{m0}$ | -1.21E+02 | $R_{s0}$ | -1.20E+02 |
| $a_{00}$ | 0.00E+00 | $b_{02}$ | 1.95E-06 |
| $a_{04}$ | 1.62E-07 | $b_{04}$ | 1.85E-09 |
| $a_{06}$ | -7.55E-10 | | |
| $a_{08}$ | 5.46E-13 | | |
| $a_{10}$ | -1.25E-16 | | |
| $a_{12}$ | 4.50E-21 | | |
| SECOND SURFACE OF SCANNING LENS L1 | | | |
| MAIN SCANNING DIRECTION | | SUB-SCANNING DIRECTION | |
| $1/C_{m0}$ | -6.20E+01 | $R_{s0}$ | -1.36E+02 |
| $a_{00}$ | 0.00E+00 | $b_{01}$ | 1.09E-05 |
| $a_{04}$ | 3.93E-07 | $b_{02}$ | -2.30E-06 |
| $a_{06}$ | -3.54E-10 | $b_{03}$ | -1.36E-08 |
| $a_{08}$ | -1.68E-14 | $b_{04}$ | 2.18E-09 |
| $a_{10}$ | 1.07E-16 | $b_{05}$ | 9.87E-12 |
| $a_{12}$ | -1.52E-20 | | |
| FIRST SURFACE OF SCANNING LENS L2 | | | |
| MAIN SCANNING DIRECTION | | SUB-SCANNING DIRECTION | |
| $1/C_{m0}$ | -5.00E+03 | $R_{s0}$ | -8.02E+01 |
| $a_{00}$ | 0.00E+00 | $b_{02}$ | 1.79E-07 |
| $a_{04}$ | 1.72E-08 | $b_{04}$ | 1.31E-10 |
| $a_{06}$ | -3.12E-12 | $b_{06}$ | -1.05E-14 |
| $a_{08}$ | -1.04E-16 | $b_{08}$ | -7.85E-19 |
| $a_{10}$ | -9.28E-22 | | |
| SECOND SURFACE OF SCANNING LENS L2 | | | |
| MAIN SCANNING DIRECTION | | SUB-SCANNING DIRECTION | |
| $1/C_{m0}$ | 1.22E+03 | $R_{s0}$ | -2.64E+01 |
| $a_{00}$ | 0.00E+00 | $b_{01}$ | -2.73E-07 |
| $a_{04}$ | -9.27E-08 | $b_{02}$ | 1.37E-06 |
| $a_{06}$ | 4.98E-12 | $b_{03}$ | -1.76E-10 |
| $a_{08}$ | -7.00E-16 | $b_{04}$ | -6.03E-11 |
| $a_{10}$ | 3.04E-20 | $b_{05}$ | 2.01E-14 |
| $a_{12}$ | -1.13E-24 | $b_{06}$ | 4.55E-15 |
| | | $b_{07}$ | -1.17E-18 |
| | | $b_{08}$ | -1.00E-18 |
| | | $b_{09}$ | 2.02E-23 |
| | | $b_{10}$ | -4.00E-23 |

FIG. 16

| FIRST SURFACE OF SCANNING LENS L1 ||||
|---|---|---|---|
| MAIN SCANNING DIRECTION || SUB-SCANNING DIRECTION ||
| $1/C_{m0}$ | -1.21E+02 | $R_{s0}$ | -1.20E+02 |
| $a_{00}$ | 0.00E+00 | $b_{02}$ | 1.95E-06 |
| $a_{04}$ | 1.62E-07 | $b_{04}$ | 1.85E-09 |
| $a_{06}$ | -7.55E-10 | | |
| $a_{08}$ | 5.46E-13 | | |
| $a_{10}$ | -1.25E-16 | | |
| $a_{12}$ | 4.50E-21 | | |
| SECOND SURFACE OF SCANNING LENS L1 ||||
| MAIN SCANNING DIRECTION || SUB-SCANNING DIRECTION ||
| $1/C_{m0}$ | -6.20E+01 | $R_{s0}$ | -1.36E+02 |
| $a_{00}$ | 0.00E+00 | $b_{01}$ | 1.09E-05 |
| $a_{04}$ | 3.93E-07 | $b_{02}$ | -2.30E-06 |
| $a_{06}$ | -3.54E-10 | $b_{03}$ | -1.36E-08 |
| $a_{08}$ | -1.68E-14 | $b_{04}$ | 2.18E-09 |
| $a_{10}$ | 1.07E-16 | $b_{05}$ | 9.87E-12 |
| $a_{12}$ | -1.52E-20 | | |
| FIRST SURFACE OF SCANNING LENS L2 ||||
| MAIN SCANNING DIRECTION || SUB-SCANNING DIRECTION ||
| $1/C_{m0}$ | -5.00E+03 | $R_{s0}$ | -8.02E+01 |
| $a_{00}$ | 0.00E+00 | $b_{02}$ | 7.09E-07 |
| $a_{04}$ | 1.72E-08 | | |
| $a_{06}$ | -3.12E-12 | | |
| $a_{08}$ | -1.04E-16 | | |
| $a_{10}$ | -9.28E-22 | | |
| SECOND SURFACE OF SCANNING LENS L2 ||||
| MAIN SCANNING DIRECTION || SUB-SCANNING DIRECTION ||
| $1/C_{m0}$ | 1.22E+03 | $R_{s0}$ | -2.63E+01 |
| $a_{00}$ | 0.00E+00 | $b_{01}$ | 7.28E-07 |
| $a_{04}$ | -9.27E-08 | $b_{02}$ | 1.77E-06 |
| $a_{06}$ | 4.98E-12 | $b_{03}$ | -1.29E-09 |
| $a_{08}$ | -7.00E-16 | $b_{04}$ | -1.20E-10 |
| $a_{10}$ | 3.04E-20 | $b_{05}$ | 4.23E-13 |
| $a_{12}$ | -1.13E-24 | $b_{06}$ | 1.01E-16 |
| | | $b_{07}$ | -5.88E-17 |
| | | $b_{08}$ | 8.73E-19 |
| | | $b_{09}$ | 2.86E-21 |
| | | $b_{10}$ | -6.19E-23 |

FIG. 19

| FIRST SURFACE OF SCANNING LENS L1 | | | |
|---|---|---|---|
| MAIN SCANNING DIRECTION | | SUB-SCANNING DIRECTION | |
| $1/C_{m0}$ | -1.21E+02 | $R_{s0}$ | -1.20E+02 |
| $a_{00}$ | 0.00E+00 | $b_{02}$ | 1.95E-06 |
| $a_{04}$ | 1.62E-07 | $b_{04}$ | 1.85E-09 |
| $a_{06}$ | -7.55E-10 | | |
| $a_{08}$ | 5.46E-13 | | |
| $a_{10}$ | -1.25E-16 | | |
| $a_{12}$ | 4.50E-21 | | |
| SECOND SURFACE OF SCANNING LENS L1 | | | |
| MAIN SCANNING DIRECTION | | SUB-SCANNING DIRECTION | |
| $1/C_{m0}$ | -6.20E+01 | $R_{s0}$ | -1.36E+02 |
| $a_{00}$ | 0.00E+00 | $b_{01}$ | 1.09E-05 |
| $a_{04}$ | 3.93E-07 | $b_{02}$ | -2.30E-06 |
| $a_{06}$ | -3.54E-10 | $b_{03}$ | -1.36E-08 |
| $a_{08}$ | -1.68E-14 | $b_{04}$ | 2.18E-09 |
| $a_{10}$ | 1.07E-16 | $b_{05}$ | 9.87E-12 |
| $a_{12}$ | -1.52E-20 | | |
| FIRST SURFACE OF SCANNING LENS L2 | | | |
| MAIN SCANNING DIRECTION | | SUB-SCANNING DIRECTION | |
| $1/C_{m0}$ | -5.00E+03 | $R_{s0}$ | -8.02E+01 |
| $a_{00}$ | 0.00E+00 | $b_{02}$ | 1.42E-06 |
| $a_{04}$ | 1.72E-08 | | |
| $a_{06}$ | -3.12E-12 | | |
| $a_{08}$ | -1.04E-16 | | |
| $a_{10}$ | -9.28E-22 | | |
| SECOND SURFACE OF SCANNING LENS L2 | | | |
| MAIN SCANNING DIRECTION | | SUB-SCANNING DIRECTION | |
| $1/C_{m0}$ | 1.22E+03 | $R_{s0}$ | -2.63E+01 |
| $a_{00}$ | 0.00E+00 | $b_{01}$ | 1.19E-07 |
| $a_{04}$ | -9.27E-08 | $b_{02}$ | 2.46E-06 |
| $a_{06}$ | 4.98E-12 | $b_{03}$ | -5.26E-10 |
| $a_{08}$ | -7.00E-16 | $b_{04}$ | -1.67E-10 |
| $a_{10}$ | 3.04E-20 | $b_{05}$ | 1.34E-13 |
| $a_{12}$ | -1.13E-24 | $b_{06}$ | 1.42E-14 |
| | | $b_{07}$ | -1.68E-17 |
| | | $b_{08}$ | -6.59E-19 |
| | | $b_{09}$ | 7.70E-22 |
| | | $b_{10}$ | 3.17E-24 |

OPTICAL SCANNING APPARATUS AND IMAGE FORMING APPARATUS

CROSS-REFERENCE TO RELATED APPLICATIONS

The present document incorporates by reference the entire contents of Japanese priority document, 2006-059232 filed in Japan on Mar. 6, 2006.

BACKGROUND OF THE INVENTION

1. Field of the Invention

The present invention relates to an optical scanning apparatus with a unit that suppresses curvature of a scanning line, and an image forming apparatus having the optical scanning apparatus incorporated therein.

2. Description of the Related Art

FIG. 1 is a general configuration example of a scanning optical system in the optical scanning apparatus.

In FIG. 1, laser beams L are emitted from a light source 1, and coupled and formed by a coupling optical system including a coupling lens 2, a cylindrical lens 3, and an aperture 4. After being coupled, the laser beam L is deflected and reflected by a rotating polygon mirror 5, scanned in a main scanning direction, and imaged as a scanning line 9 on a surface 8 to be scanned as an image surface, in this example, on a columnar photoconductor 10 as a columnar image carrier, by a first scanning lens 6a and a second scanning lens 6b, which form an imaging optical system. The photoconductor 10 rotates about a central axis in a circumferential direction, so that an image forming surface moves in a direction vertical to the main scanning direction, optical scanning is performed by the laser beam L, and a latent image is formed by exposure.

Reference numerals 7a to 7c in FIG. 1 are folding mirrors that deflect the laser beam L from the second scanning lens 6b towards the surface 8 to be scanned.

According to conventional techniques in this field, in the scanning optical system, there has been proposed a configuration that a scanning line curvature can be corrected by providing an optical element-deforming unit (not shown) in, for example, the second scanning lens 6b, even when there are factors such as a manufacturing error of the optical scanning apparatus, for example, a metrication error in the optical element, eccentricity of an optical surface, and an installation error.

Japanese Patent Application Laid-open No. 2002-131674 discloses a technique to provide a mechanism for making a position for supporting a scanning lens movable, and inclining an optical axis of the scanning lens in a sub-scanning direction relative to an optical axis of the scanning optical system. However, the problem of the scanning line curvature is not solved.

Japanese Patent Application Laid-open No. 2004-109761 discloses a technique in which occurrence of the scanning line curvature due to a temperature change with the lapse of time is reduced by providing a lens shape-maintaining unit formed of a sheet metal, and a scanning-line curvature-correcting unit and an inclination correcting unit are provided in the scanning lens.

Japanese Patent Application Laid-open No. 2004-287380 discloses a technique in which a pressing member is provided relative to a long scanning lens, a unit that deforms the scanning lens is provided for each lens-clamping member, thereby improving adjustment tolerance, and the scanning line curvature is corrected in initial manufacturing adjustment.

Japanese Patent Application Laid-open No. 2005-62834 discloses a technique for reducing the scanning line curvature by providing a scanning line curvature-adjusting member in a so-called grazing-incidence scanning optical system, in which a plurality of beams enter with an angle different in the sub-scanning direction. However, it is only described that a refracting power in the sub-scanning direction is small outside the axis as the characteristic of the optical element, and it is not sufficient for suppressing the occurrence of the scanning line curvature only by this condition. Further, the description is only for the grazing-incidence scanning optical system.

Accordingly, a measure against the scanning line curvature due to the manufacturing error, which generally occurs in the scanning optical system, is required.

In recent years, due to developments of high-definition full-color image forming apparatuses, in the optical scanning apparatus used in this type of image forming apparatuses, it is required to reduce deviations, namely out-of-color registration, which occurs when dots in respective colors are superposed at a desired position, in addition to improvement of reproducibility of an image by downsizing a beam spot diameter.

Currently, demands for optical properties such as field curvature correction, reduction of sub-scanning lateral magnification, or downsizing of optical spots are further increasing due to demands for higher image quality. Therefore, reduction of flexibility in the sub-scanning direction in the scanning optical system is a problem in improving the image quality.

In a lens having a strong refracting power in the sub-scanning direction, however, decentering between opposite optical surfaces becomes the main cause of occurrence of the scanning line curvature. Further, in the scanning optical system formed of two scanning lenses, there is a general configuration that the refracting power in the sub-scanning direction is borne by a lens closest to the surface to be scanned. Accordingly, it has been proposed to apply a scanning-line curvature-correcting unit that corrects the scanning line curvature to a scanning lens having the refracting power in the sub-scanning direction (for example, see Japanese Patent Application Laid-open Nos. 2004-109761 and 2004-287380).

However, correction becomes difficult according to the shape of the scanning line. Therefore, it is required to provide an optical scanning apparatus that can achieve higher image quality by including an optical system having a shape capable of easy correction of the scanning line curvature.

When the scanning-line curvature-correcting unit has high precision, the scanning line curvature can be corrected effectively. However, the configuration thereof becomes complicated, thereby causing a cost increase of the apparatus itself due to an increase in the number of parts, a decrease in the productivity, and deterioration of a yield, and the apparatus itself becomes large.

SUMMARY OF THE INVENTION

It is an object of the present invention to at least partially solve the problems in the conventional technology.

According to an aspect of the present invention, an optical scanning apparatus includes a deflector that deflects to scan beams from a light source in a main scanning direction; a scanning optical system that includes at least one optical element having a refracting power in a sub-scanning direction orthogonal to the main scanning direction and images the beams on a surface to be scanned; and an optical element-deforming unit that deforms the optical element so that a position of the center of curvature of the optical element in the sub-scanning direction changes in a direction substantially parallel to the sub-scanning direction, wherein a function $Cs(y)$ of a curvature in the sub-scanning direction in a main scanning coordinate y on a generatrix of the optical system on at least one surface, of optical surfaces included in the optical element, is set to have only one extreme value within a mirror surface region of the optical element.

According to another aspect of the present invention, an optical scanning apparatus includes a deflector that deflects to scan beams from a light source in a main scanning direction; a scanning optical system that includes at least one optical element having a refracting power in a sub-scanning direction orthogonal to the main scanning direction and images the beams on a surface to be scanned; and an optical element-deforming unit that deforms the optical element so that a position of the center of curvature of the optical element in the sub-scanning direction changes in a direction substantially parallel to the sub-scanning direction, wherein a function $Cs(y)$ of a curvature in the sub-scanning direction in a main scanning coordinate y on a generatrix of the optical system on at least one surface, of optical surfaces included in the optical element, is set to have three extreme values within a mirror surface region of the optical element, and satisfy:

$$1 > D/L > 0.82 \qquad (3)$$

where L denotes the mirror surface region of the optical element in the main scanning direction, and D denotes a distance in the main scanning direction of two extreme values respectively closest to opposite ends of the mirror surface region, of the three extreme values.

According to still another aspect of the present invention, an optical scanning apparatus includes a deflector that deflects to scan beams from a light source in a main scanning direction; a scanning optical system that includes at least one optical element having a refracting power in a sub-scanning direction orthogonal to the main scanning direction and images the beams on a surface to be scanned; and an optical element-deforming unit that deforms the optical element so that a position of the center of curvature of the optical element in the sub-scanning direction changes in a direction substantially parallel to the sub-scanning direction, wherein a function $Cs(y)$ of a curvature in the sub-scanning direction in a main scanning coordinate y on a generatrix of the optical system on at least one surface, of optical surfaces included in the optical element, is set to satisfy Equation (5) or an approximation of Equation (5) within a mirror surface region of the optical element:

$$Cs(y) = A + b_1 \cdot y + b_2 \cdot y^2 + b_3 \cdot y^3 + b_4 \cdot y^4 + \ldots \qquad (5)$$

wherein A, representing a curvature in the sub-scanning direction at a center of a respective optical surface, is a constant equal to $Cs(0)$, with units of millimeters$^{-1}$, and wherein a coefficient $b_x$, which is not $b_x = 0$ (x=integer of from 1 to n), satisfies a relationship of $\log(|b_x/b_2|) < 2 \cdot (2-x)$.

According to still another aspect of the present invention, an optical scanning apparatus includes a deflector that deflects to scan beams from a light source in a main scanning direction; a scanning optical system that includes at least one optical element having a refracting power in a sub-scanning direction orthogonal to the main scanning direction and images the beams on a surface to be scanned; and an optical element-deforming unit that deforms the optical element so that a position of the center of curvature of the optical element in the sub-scanning direction changes in a direction substantially parallel to the sub-scanning direction, wherein the optical element is a transmission optical element having two optical surfaces, and it is set such that when one of the optical surfaces is moved in the sub-scanning direction parallel to the other optical surface and is decentered, a scanning line formed of optical spots on the surface to be scanned has only one extreme value.

According to still another aspect of the present invention, an An image forming apparatus includes at least one image carrier and the above optical scanning apparatus provided relative to the image carrier, which forms an image by performing optical scanning relative to the image carrier.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 2 depicts lens shape data of a scanning lens in the scanning optical system according to a first embodiment of the present invention;

FIG. 5 depicts lens shape data of a scanning lens in a scanning optical system of a comparative example;

FIG. 10 depicts lens shape data of a scanning lens in a scanning optical system according to a second embodiment of the present invention;

FIG. 13 depicts lens shape data of a scanning lens in a scanning optical system according to a third embodiment of the present invention;

FIG. 16 depicts lens shape data of a scanning lens in a scanning optical system according to a fourth embodiment of the present invention;

FIG. 19 depicts lens shape data of a scanning lens in a scanning optical system according to a fifth embodiment of the present invention;

DETAILED DESCRIPTION OF THE PREFERRED EMBODIMENTS

Figure 1:
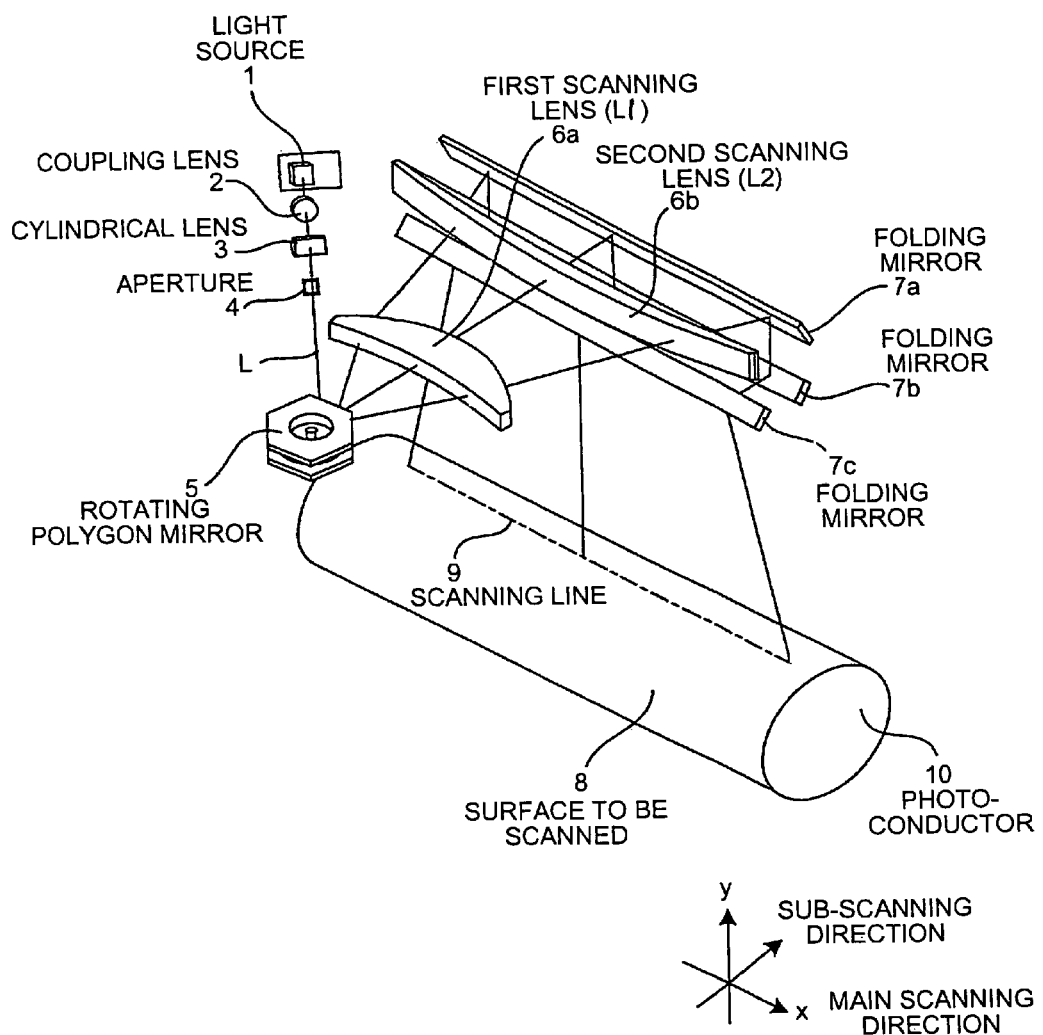
FIG. 1 is a perspective view of a general configuration example of a scanning optical system in an optical scanning apparatus.

Exemplary embodiments of the present invention will be explained below in detail with reference to the accompanying drawings. An optical scanning apparatus according to the embodiments has basically the same configuration as that of an optical scanning apparatus including the scanning optical system explained with reference to FIG. 1. Like reference numeral refer to like members corresponding to ones already explained, and redundant explanations will be omitted.

FIG. 2 depicts lens shape data of a first scanning lens (L1) 6a and a second scanning lens (L2) 6b, which are transmission optical elements in the scanning optical system according to a first embodiment of the present invention. All four optical surfaces of the first and the second surfaces are special toroidal surfaces according to Equations (1) and (2) (Y denotes lens height). X(Y) denotes a coordinate in an optical axis direction in a coordinate (lens height) in the main scanning direction.

$$X(Y) = \frac{C_{m0} \cdot Y^2}{1 + \sqrt{1 - (1 + a_{00}) \cdot C_{m0}^2 \cdot Y^2}} + \qquad (1)$$
$$a_{01} \cdot Y + a_{02} \cdot Y^2 + a_{03} \cdot Y^3 + a_{04} \cdot Y^4 + \cdots$$

$$Cs(Y) = \frac{1}{R_{S0}} + b_{01} \cdot Y + b_{02} \cdot Y^2 + b_{03} \cdot Y^3 + \cdots \qquad (2)$$

In the first embodiment, the wavelength of a light source 1 shown in FIG. 1 is 655 nanometers, a rotary polygon mirror 5 as a deflector has six mirror surfaces having an inscribed circle radius of 18 millimeters, both scanning lenses 6a and 6b have a refractive index of 1.5273, incident beams of laser beams L to the rotary polygon mirror 5 form an angle of 58 degrees relative to an optical axis of the scanning lenses 6a and 6b, and the beams of the laser beams L are imaged in the sub-scanning direction near the rotary polygon mirror 5, and are parallel to the main scanning direction.

The distance from a central axis of rotation of the rotary polygon mirror 5 to the closest first scanning lens 6a is 56.75 millimeters, the thickness of the first scanning lens 6a is 8.4 millimeters, the distance from the first scanning lens 6a to the second scanning lens 6b is 98.6 millimeters, the thickness of the second scanning lens 6b is 3.8 millimeters, and the distance from the second scanning lens 6b to the surface 8 to be scanned is 147.2 millimeters.

Figure 8:
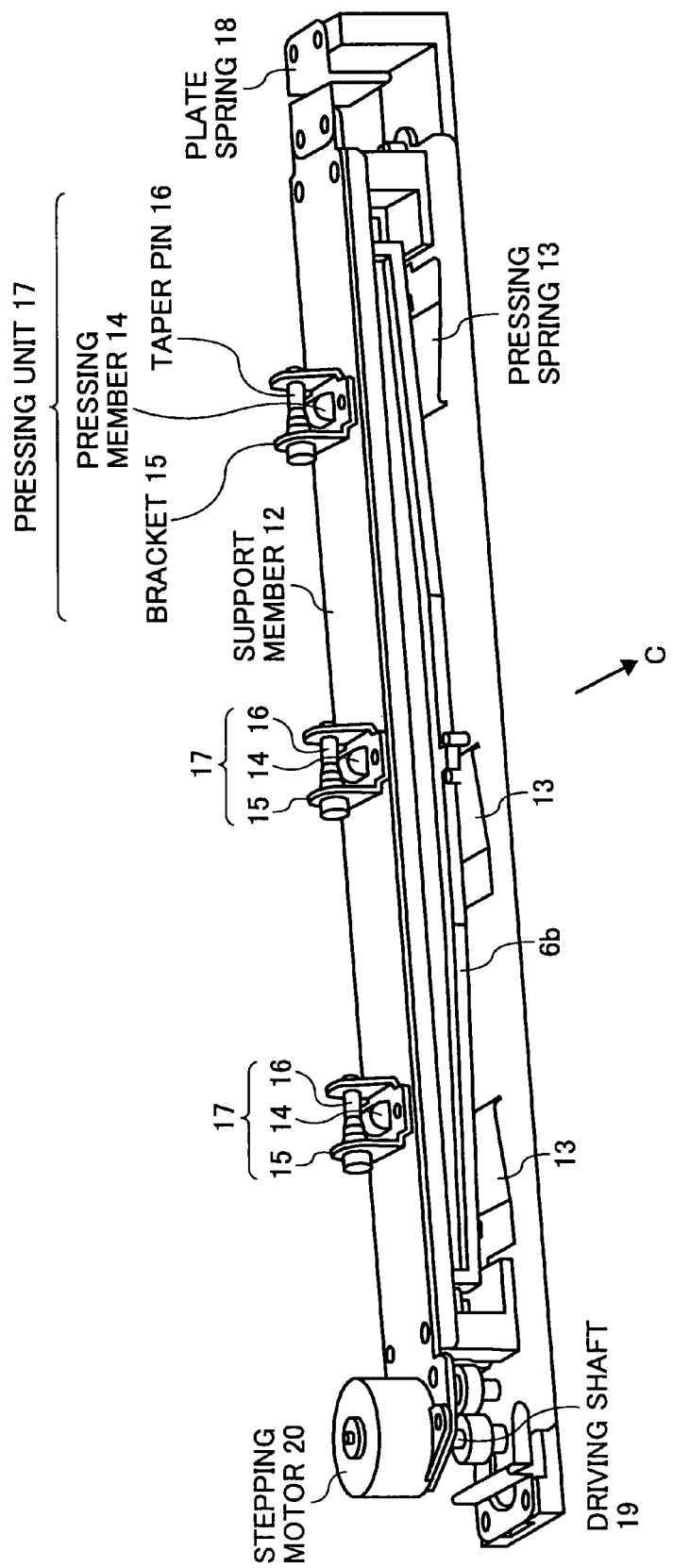
FIG. 8 is a perspective view of an optical element-deforming unit according to the first embodiment.
Figure 9:
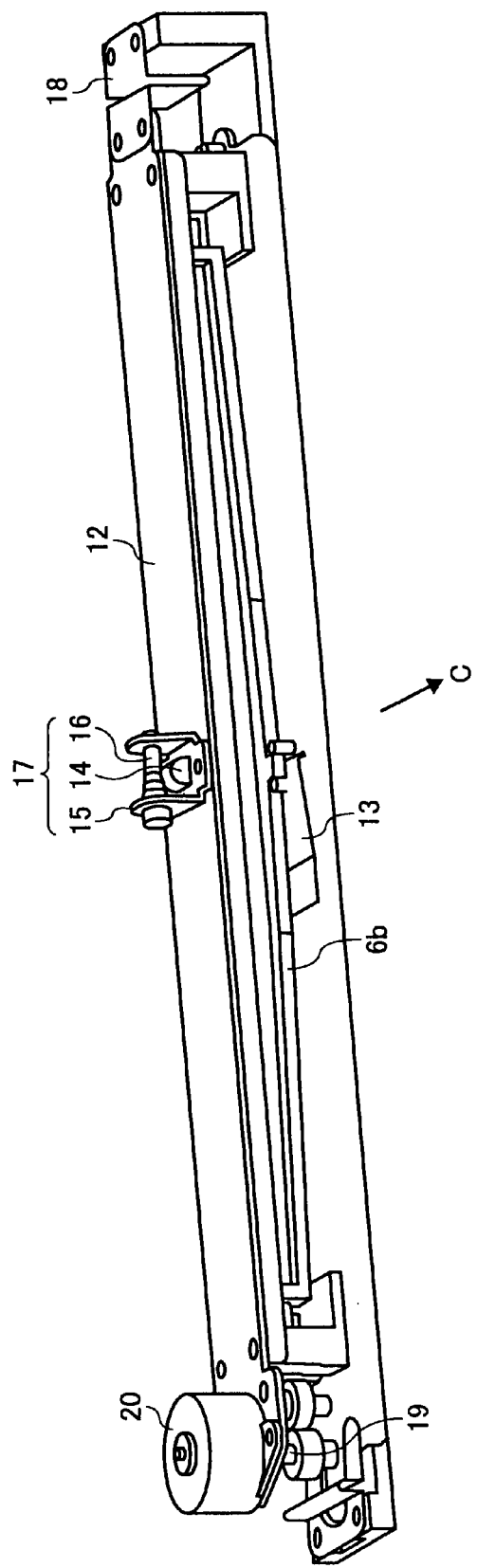
FIG. 9 is a perspective view of a modified example of the optical element-deforming unit according to the first embodiment.

In the first embodiment, the second scanning lens 6b has a refracting power in the sub-scanning direction, and an optical element-deforming unit as shown in FIGS. 8 and 9 is provided such that a position of the center of curvature of the second scanning lens 6b in the sub-scanning direction changes in a direction substantially parallel to the sub-scanning direction.

Figure 3:
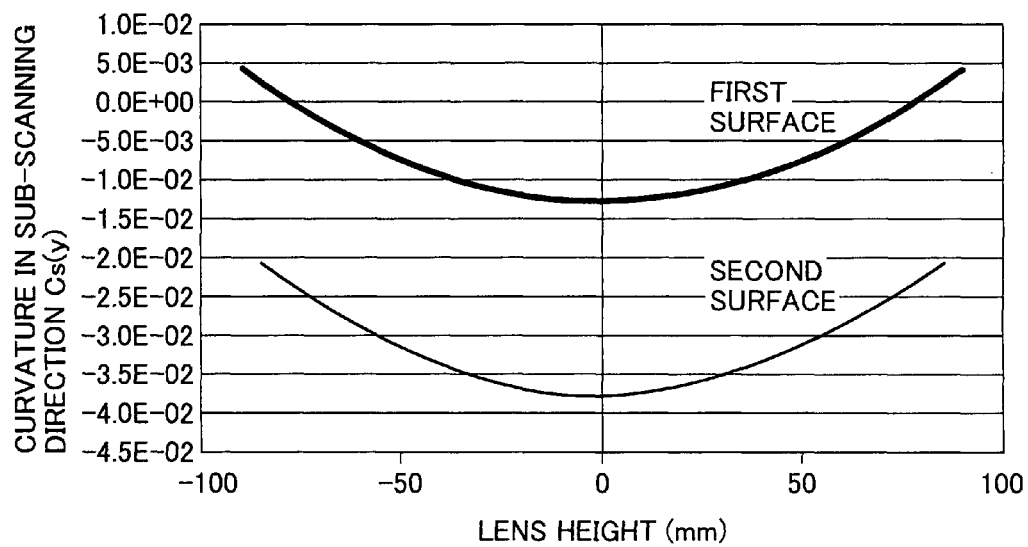
FIG. 3 depicts a function $Cs(y)$ of a curvature relative to lens height in a sub-scanning direction of the scanning lens according to the first embodiment.

The second scanning lens 6b according to the first embodiment has a function Cs(y) of a curvature in the sub-scanning direction of the scanning lens deformed by the optical element-deforming unit relative to the lens height set so as to have only one extreme value within a mirror surface region on the first surface of the lens, as shown in FIG. 3 (here, only the mirror surface region, which is a range in which the lens is processed as an optical surface, is shown).

Figure 4:
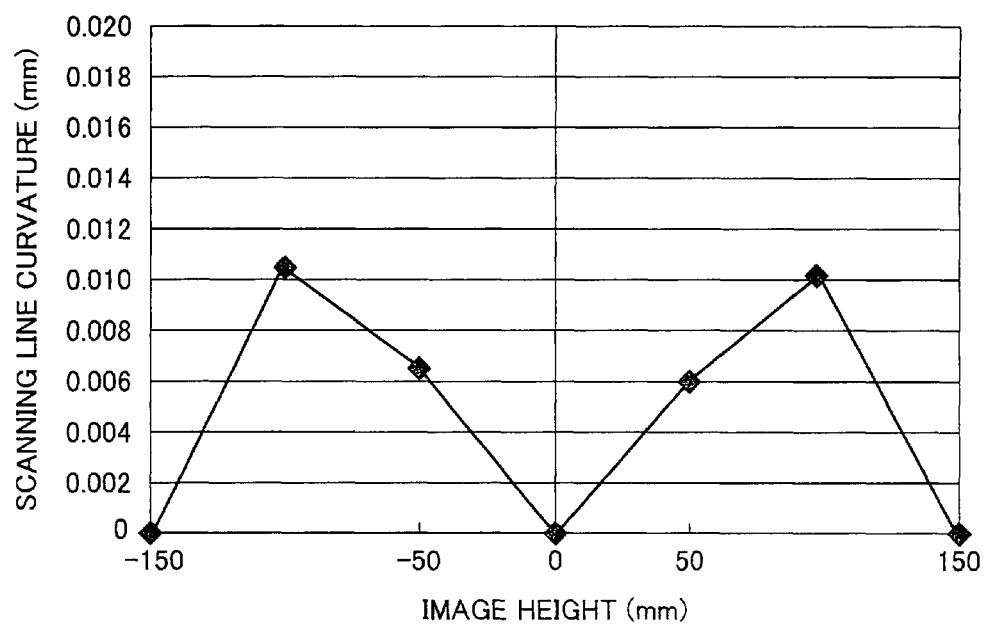
FIG. 4 is a graph of a scanning line curvature in the scanning lens according to the first embodiment.

According to the first embodiment, the scanning line curvature has a maximum value of 10.3 micrometers as shown in FIG. 4, which is reduced as compared to a comparative example described later.

Furthermore, in the first embodiment, both optical surfaces of the second scanning lens 6b are set such that the function Cs(y) has only one extreme value as shown in FIG. 3, thereby further reducing the scanning line curvature. As is understood from the lens shape data in FIG. 2, the scanning lens 6b can be expressed by a quadratic function.

For comparison, the scanning line curvature is evaluated, using a comparative example adopting the configuration of the conventional lens shape data shown in FIG. 5. In this comparative example, the optical surface of a first surface and a second surface of the second scanning lens 6b are the special toroidal surfaces according to Equations (1) and (2). The wavelength of the light source, the rotary polygon mirror, the refractive index of the scanning lens, and distances between respective surfaces are set equal to those in first embodiment. The second scanning lens 6b has a refracting power in the sub-scanning direction, and the optical element-deforming unit same as in the first embodiment is provided such that the position of the center of curvature of the second scanning lens 6b in the sub-scanning direction changes in a direction substantially parallel to the sub-scanning direction.

Figure 6:
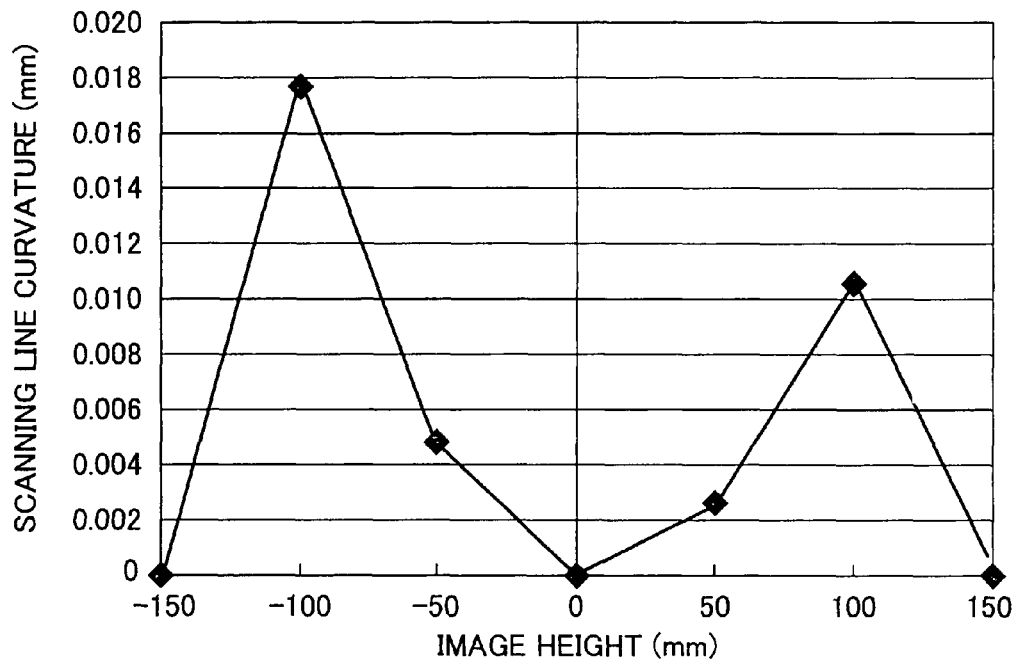
FIG. 6 is a graph of a scanning line curvature in the scanning lens of the comparative example.

If taking an error occurring at the time of manufacturing the optical scanning apparatus into consideration a scanning line curvature will occur, and when the scanning line curvature is corrected by the optical element-deforming unit, it is assumed that the scanning line curvature after the correction becomes as shown in FIG. 6, in which the maximum value of the scanning line curvature is 17.8 micrometers. If environmental variations in temperature and humidity occur, the scanning line curvature further increases. Because a plurality of optical scanning apparatuses are generally used in a full-color image forming apparatus, particularly, in a four-stage tandem image forming apparatus that can achieve high speed, the scanning line curvatures of respective optical scanning apparatuses are accumulated, thereby degrading the image quality of an output image.

Figure 7:
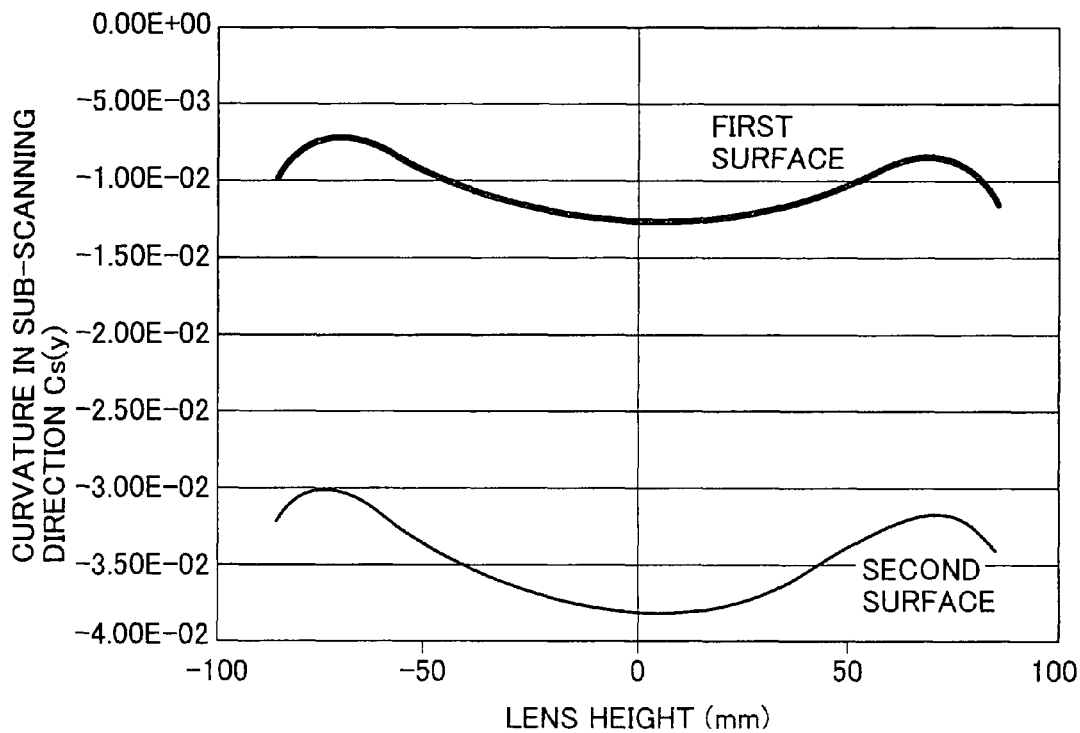
FIG. 7 depicts a function $Cs(y)$ of a curvature relative to lens height in the sub-scanning direction of the scanning lens of the comparative example.

In the comparative example, the function Cs(y) of the curvature in the sub-scanning direction of the scanning lens L2 deformed by the optical element-deforming unit relative to the lens height is as shown in FIG. 7, in which only the mirror surface region, which is a range in which the lens is processed as an optical surface, is shown.

As is understood from the comparison with the comparative example, the scanning line curvature in the comparative example is 17.8 micrometers, whereas in the first embodiment, the scanning line curvature is 10.3 micrometers as the maximum value, and therefore the scanning line curvature can be remarkably reduced as compared to the comparative example.

An optical-element deforming device as the optical element-deforming unit is explained next.

FIG. 8 is a perspective view of the optical-element deforming device as the optical element-deforming unit according to the first embodiment. The long second scanning lens (hereinafter, as scanning lens) 6b is supported with a lower part (three points in the first embodiment) thereof is pressed against a support member 12 by a pressing spring 13.

A pressing member 14 formed of a columnar roller is provided on the upper part of the support member 12 facing the respective pressing springs 13 so as to abut against the upper part of the scanning lens 6b. The pressing member 14 is arranged such that the axial direction thereof is parallel to a direction C of the optical axial of the scanning lens 6b. A taper pin 16 is supported by a bracket 15 and arranged respectively above each pressing member 14. The taper pin 16 can be moved for adjustment in a longitudinal direction (main scanning direction) of the scanning lens 6b by a screw mechanism. The scanning lens 6b is deformed by moving the taper pin 16 so as to press or release the pressure against the scanning lens 6b by the tapered part via the pressing member 14.

Because the scanning lens is pressed and bent, the position of the center of curvature of the scanning lens in the sub-scanning direction at this portion moves substantially parallel to the sub-scanning direction. Even at portions other than the pressed part, the center of curvature in the sub-scanning direction moves substantially parallel to the sub-scanning direction. When the taper pin 16 is adjusted in a direction of releasing the pressure, and the pressing member 14 moves in a direction away from the scanning lens 6b, the scanning lens 6b is deformed by an upward pressure of the pressing spring 13.

Because the center of curvature of the scanning lens 6b in the sub-scanning direction is adjusted in the sub-scanning direction, an imaging point on the surface 8 to be scanned also moves in the sub-scanning direction so as to reduce the scanning line curvature.

In the example shown in FIG. 8, a pressing unit 17 including the pressing member 14, the bracket 15, and the taper pin 16 is provided at three positions, thereby enabling highly accurate adjustment so as to reduce the scanning line curvature. Further, by a plate spring 18 that supports one end of the support member 12, and a scanning-line inclination-correcting unit formed of a stepping motor 20, which corrects scanning line inclination of the scanning lens 6b by driving a driving shaft 19 up and down to displace the plate spring 18, the scanning lens 6b can be rotated around a shaft parallel to an optical axis C, to adjust the inclination. Accordingly, scanning line inclination can be also corrected.

As another example of the optical element-deforming unit, one having a configuration as shown in FIG. 9 can be used. In a modified example shown in FIG. 9, like members as in FIG. 8 are denoted by like reference numerals, and detailed explanations thereof will be omitted. While the pressing unit 17 shown in FIG. 8 is provided at three positions, in the example shown in FIG. 9, the pressing unit 17 is provided at only one position substantially at the center of the scanning lens 6b. Thus, when only one position is pressed, the scanning lens 6b deforms in a shape approximating a parabola (quadric curve), at the time of adjusting the scanning line curvature.

In the optical scanning apparatus according to the first embodiment, even if a scanning line curvature occurs due to a manufacturing error, because the scanning line curves in the shape approximating the parabola, an optical system that can correct the scanning line curvature easily by adjustment only at one point as shown in FIG. 9 can be provided. Even by this one-point adjusting method shown in FIG. 9, the scanning line curvature can be corrected substantially to the same level as with a three-point adjusting method shown in FIG. 8. According to the configuration shown in FIG. 9, the number of parts can be reduced, and the adjusting positions can be reduced, thereby enabling cost reduction.

FIG. 10 depicts lens shape data of the scanning lens according to a second embodiment of the present invention, where Equations (1) and (2) for an optical surface shape, wavelength of the light source, refractive indexes of the rotary polygon mirror and the scanning lens, and the distance between respective surfaces are set equal to those in the first embodiment. In the second embodiment, the scanning lens 6b has a refracting power in the sub-scanning direction, and the optical element-deforming unit is provided such that the position of the center of curvature of the scanning lens 6b in the sub-scanning direction changes in a direction substantially parallel to the sub-scanning direction.

Figure 11:
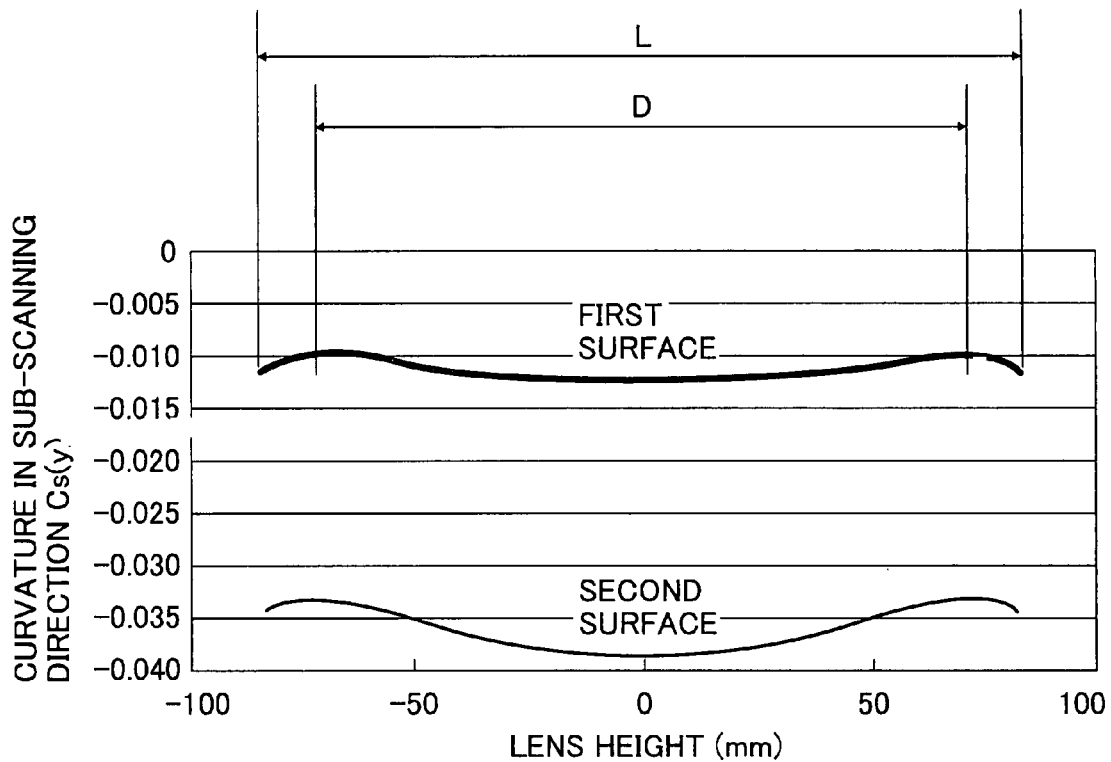
FIG. 11 depicts a function $Cs(y)$ of a curvature relative to lens height in a sub-scanning direction of the scanning lens according to the second embodiment.

As shown in FIG. 11, in the second embodiment, the function Cs(y) is set so as to have three extreme values for the first surface of the scanning lens 6b. Among those extreme values, if the main scanning distance between two extreme values positioned at the ends of the mirror surface region is assumed to be D, the coordinate of the extreme values becomes −70 and 70. Therefore, D is 140 millimeters, and the mirror surface region L is ±84 and becomes 168 millimeters. Accordingly, D/L becomes 0.833, and satisfies:

$$1 > D/L > 0.82 \quad (3)$$

With regard to the second surface of the scanning lens 6b, D=156, hence D/L=0.929. Accordingly, the first surface and the second surface as the optical surfaces of the scanning lens 6b provided with the optical element-deforming unit both satisfy the condition of Equation (3).

Further, the second surface of the scanning lens 6b also satisfies:

$$1 > D/L > 0.90 \quad (4)$$

Figure 12:
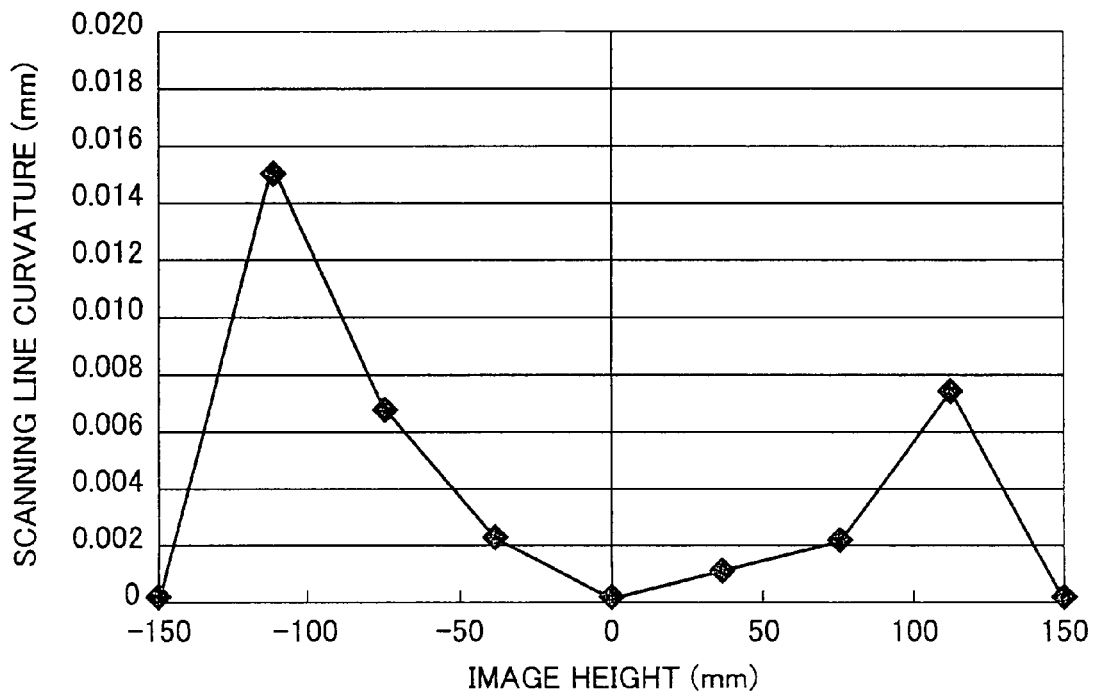
FIG. 12 is a graph of a scanning line curvature in the scanning lens according to the second embodiment.

According to the configuration of the second embodiment, the scanning line curvature has a maximum value of 15.1 micrometers as shown in FIG. 12. Accordingly, the scanning line curvature is reduced as compared with the comparative example having the maximum value of 17.8 micrometers.

FIG. 13 depicts lens shape data of the scanning lens according to a third embodiment of the present invention, where Equations (1) and (2) for the optical surface shape, wavelength of the light source, refractive indexes of the rotary polygon mirror and the scanning lens, and the distance between respective surfaces are set equal to those in the first embodiment. In the third embodiment, the scanning lens 6b has a refracting power in the sub-scanning direction, and the optical element-deforming unit is provided such that the position of the center of curvature of the scanning lens 6b in the sub-scanning direction changes in a direction substantially parallel to the sub-scanning direction.

Figure 14:
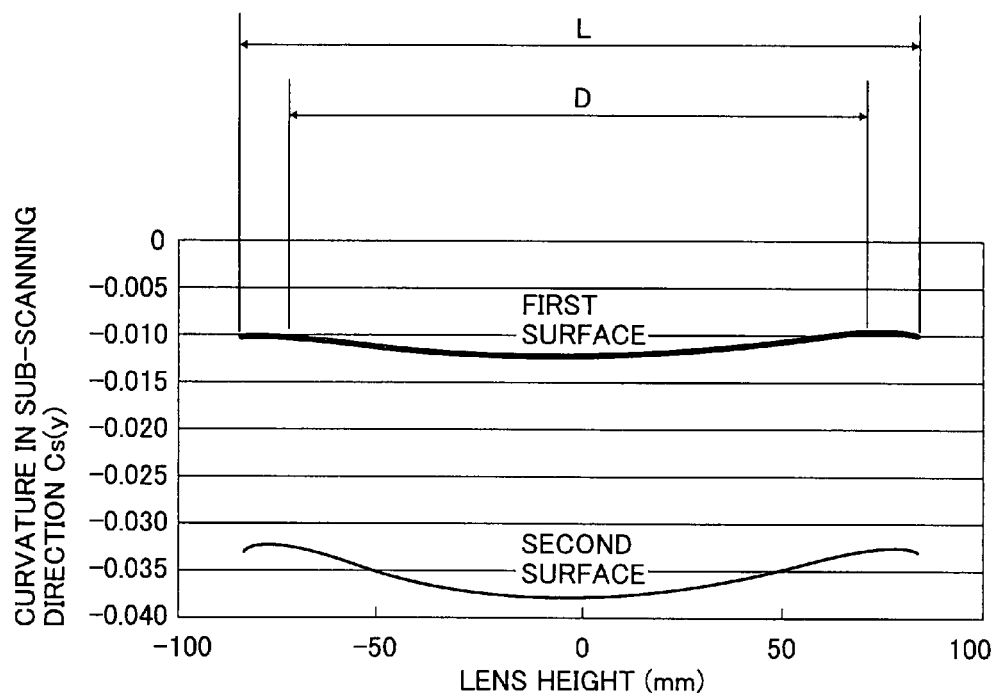
FIG. 14 depicts a function $Cs(y)$ of a curvature relative to lens height in a sub-scanning direction of the scanning lens according to the third embodiment.

As shown in FIG. 14, in the third embodiment, the function Cs(y) has three extreme values for the first surface of the scanning lens 6b. Among these extreme values, if the main scanning distance between two extreme values positioned at the ends of the mirror surface region is assumed to be D, the coordinate of the extreme values becomes −76 and 76. Therefore, D is 152 millimeters, and the mirror surface region L is ±84 and becomes 168 millimeters. Accordingly, D/L becomes 0.905, and satisfies Equation (4).

With regard to the second surface of the scanning lens 6b, D=156, hence D/L=0.929. Accordingly, the first surface and the second surface as the optical surfaces of the scanning lens 6b both satisfy Equation (4).

Figure 15:
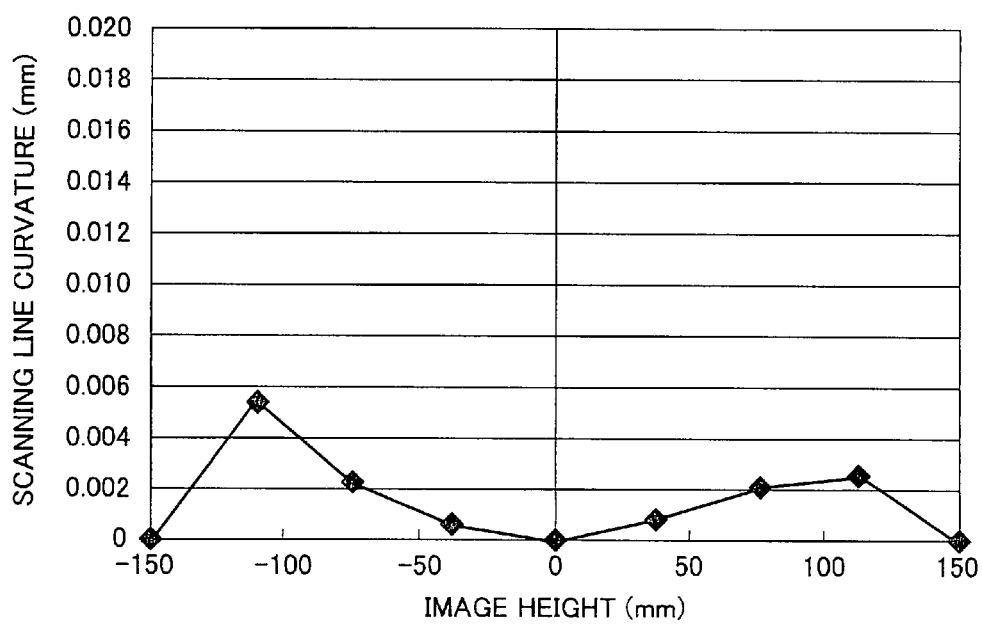
FIG. 15 is a graph of a scanning line curvature in the scanning lens according to the third embodiment.

According to the configuration of the third embodiment, the scanning line curvature has a maximum value of 5.56* micrometers as shown in FIG. 15. Accordingly, the scanning line curvature is reduced effectively as compared with the comparative example having the maximum value of 17.8 micrometers.

FIG. 16 depicts lens shape data of the scanning lens according to a fourth embodiment of the present invention, where Equations (1) and (2) for the optical surface shape, wavelength of the light source, refractive indexes of the rotary polygon mirror and the scanning lens, and the distance between respective surfaces are set equal to those in the first embodiment. In the fourth embodiment, the scanning lens 6b has a refracting power in the sub-scanning direction, and the optical element-deforming unit is provided such that the position of the center of curvature of the scanning lens 6b in the sub-scanning direction changes in a direction substantially parallel to the sub-scanning direction.

Figure 17A:
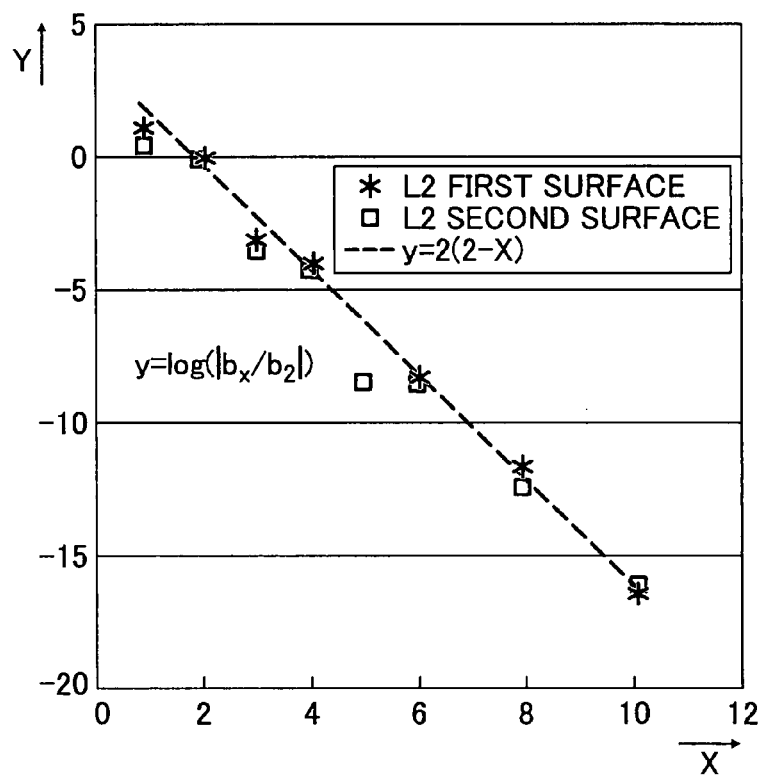
FIGS. 17A and 17B are schematic for explaining points plotted by $y = \log(|b_x/b_{02}|)$ in an area below a line expressed by $y = 2(2-x)$, of the fourth embodiment and a comparative example.
Figure 17B:
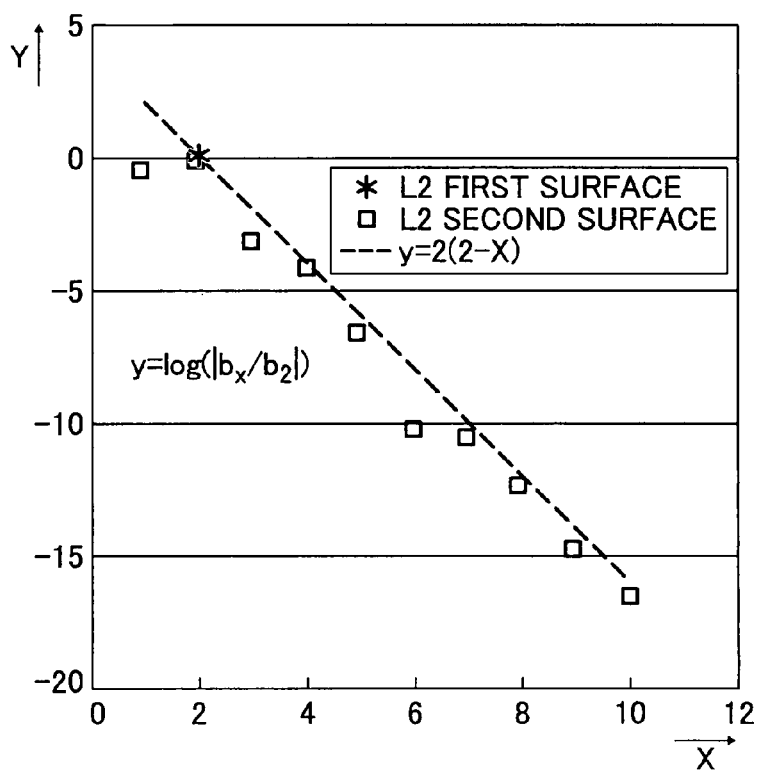

In the fourth embodiment, as shown in FIG. 17B, points plotted by $y = \log(|b_x/b_{02}|)$ are positioned in an area below a line expressed by $y = 2(2-x)$, calculated from the lens shape data of the second surface of the scanning lens 6b. Only the point at $x=2$ matches the line. b denotes $b_{01}, b_{03}, b_{04} \ldots$ (x is an integer of from 1 to n), as in Equation (2). In other words, the second surface of the scanning lens 6b according to the fourth embodiment is set to satisfy Equation (5) or an approximation of Equation (5):

$$Cs(y) = A + b_1 \cdot y + b_2 \cdot y^2 + b_3 \cdot y^3 + b_4 \cdot y^4 + \ldots \quad (5)$$

wherein A, representing a curvature in the sub-scanning direction at a center of a respective optical surface, is a constant equal to $Cs(0)$, with units of millimeters$^{-1}$, and wherein a coefficient $b_x$, which is not $b_x=0$ (x=integer of from 1 to n), satisfies: the relationship of $\log(|b_x/b_2|) < 2 \cdot (2-x)$. $b_x$ denotes $b_{01}, b_{03}, b_{04}, \ldots$.

With regard to the first surface of the scanning lens 6b, because all of the quadratic coefficients other than $b_{03}$ are zero, the two optical surfaces of the scanning lens 6b satisfy the condition of Equation (5) in the fourth embodiment.

Figure 18:
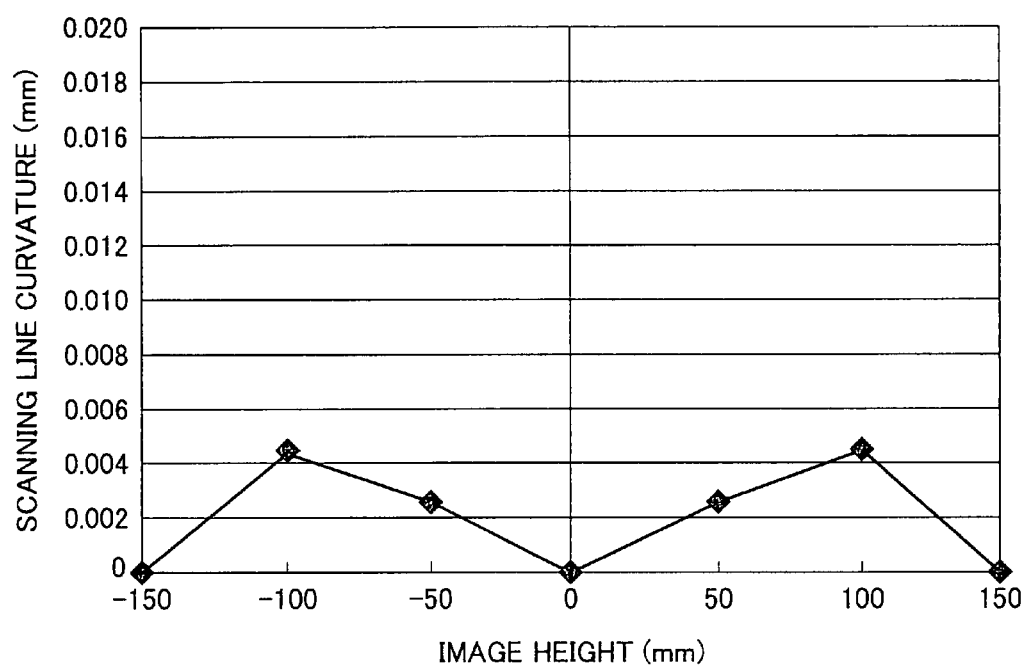
FIG. 18 is a graph of a scanning line curvature in the scanning lens according to the fourth embodiment.

According to the configuration of the fourth embodiment, a result of calculation of the scanning line curvature is as shown in FIG. 18, where the maximum value of the scanning line curvature is 4.45 micrometers.

Meanwhile, in the comparative example, as shown in FIG. 17A, at $x=8$ on the first surface of the scanning lens 6b and at $x=10$ on the second surface of the scanning lens 6b, the scanning line curvature becomes 17.8 micrometers, because of the relationship of $\log(|b_x/b_2|) < 2 (2-x)$ Therefore, the scanning line curvature cannot be completely corrected, and a large curve remains. Thus, it can be understood that the scanning line curvature can be effectively reduced in the fourth embodiment, as compared with the comparative example. In other words, it is understood that the scanning line curvature cannot be corrected satisfactorily, unless the condition of Equation (5) is satisfied by at least one surface of the optical surfaces.

FIG. 19 depicts lens shape data of a scanning lens according to a fifth embodiment of the present invention, where Equations (1) and (2) for the optical surface shape, wavelength of the light source, refractive indexes of the rotary polygon mirror and the scanning lens, and the distance between respective surfaces are set equal to those in the first embodiment. In the fifth embodiment, the scanning lens 6b has a refracting power in the sub-scanning direction, and the optical element-deforming unit is provided such that the position of the center of curvature of the scanning lens 6b in the sub-scanning direction changes in a direction substantially parallel to the sub-scanning direction.

In the fifth embodiment, it is set such that when either one of the optical surfaces of the scanning lens 6b is moved in the sub-scanning direction parallel to the other optical surface and is decentered, the scanning line curvature has only one extreme value relative to the image height.

Figure 20A:
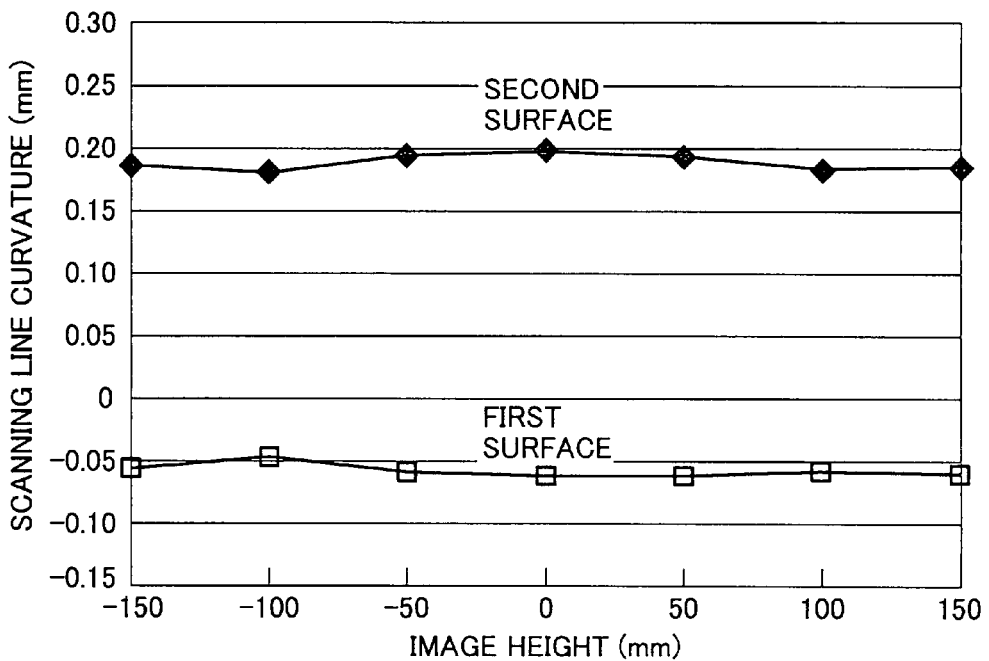
FIGS. 20A and 20B depict a function Cs(y) of a curvature relative to lens height in a sub-scanning direction of scanning lens of the fifth embodiment and a comparative example.
Figure 20B:
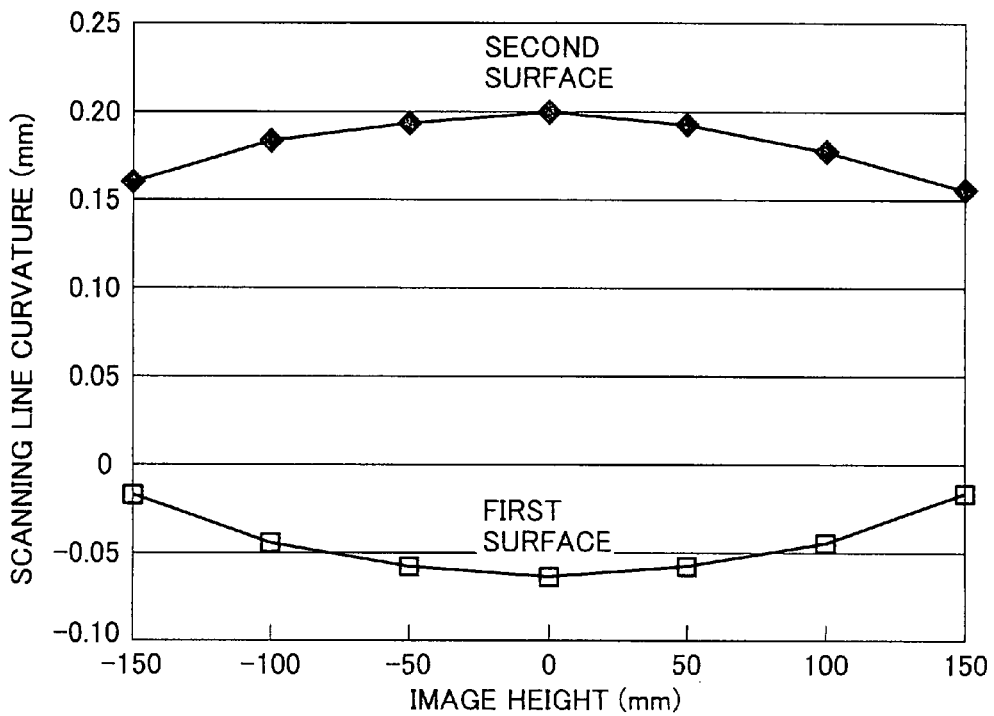

In other words, as shown in FIG. 20B, a lower curve denotes a scanning line when the first surface of the scanning lens 6b is decentered by −0.07 millimeter in the sub-scanning direction, and an upper curve denotes a scanning line when the second surface of the scanning lens 6b is decentered by −0.07 millimeter in the sub-scanning direction. In both cases, the scanning line curvature having only one extreme value is represented.

Figure 21:
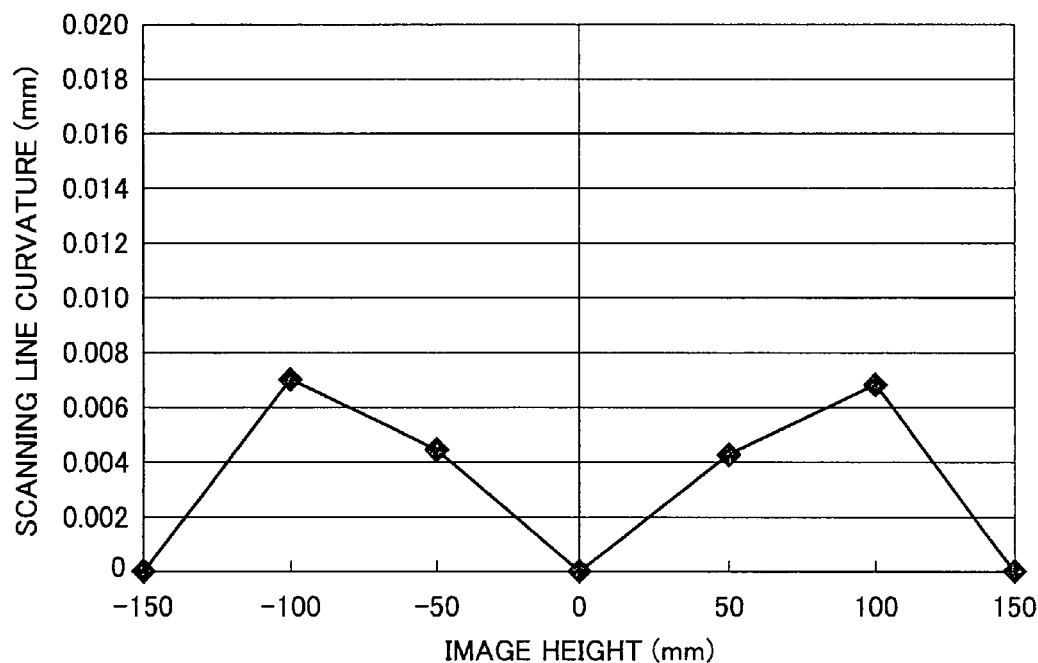
FIG. 21 is a graph of a scanning line curvature in the scanning lens according to the fifth embodiment.

In the scanning lens 6b having a refracting power in the sub-scanning direction, decentering of the optical surface due to a manufacturing error mainly causes an increase of the scanning line curvature. Above all, decentering due to parallel movement in the sub-scanning direction is the major problem. Accordingly, the optical surface needs to be set, assuming this component in the manufacturing error. When decentering occurs in the sub-scanning direction, in the fifth embodiment, by setting the optical surface so as to have a scanning line curvature having one extreme value as shown in FIG. 20B, the value of the scanning line curvature after correction by the optical element-deforming unit becomes 7.05 micrometers, as shown in FIG. 21, thereby enabling excellent scanning line curvature correction.

On the other hand, in the comparative example, when similar decentering occurs, as shown in FIG. 20A, the scanning line has three extreme values, and therefore the scanning line curvature becomes 17.8 micrometers and remains largely after correction.

In the fifth embodiment, at least one surface of the optical surfaces of the optical element (scanning lens 6b) can be set such that a range of a value of the function $Cs(y)$ within the mirror surface region (a difference between the maximum value and the minimum value) is equal to or less than 0.01. By limiting the range in this manner, a difference of the refracting power of the scanning lens 6b in the sub-scanning direction can be decreased and the scanning line curvature can be controlled to a level capable of easily being corrected, even when decentering on the optical surface occurs. The fifth embodiment corresponds to this condition. The range of the value of $Cs(y)$ on the first surface of the scanning lens 6b is 0.01, and the scanning line curvature at this time is 7.05 micrometers.

The scanning line curvature can be reduced further by setting the range of the value of the function $Cs(y)$ within the mirror surface region to 0.005 or less. The fourth embodiment corresponds to this condition, where the range of the value of the function $Cs(y)$ on the first surface of the scanning lens 6b is set to 0.005, and therefore the scanning line curvature can be reduced further to 4.45 micrometers.

In the fifth embodiment, the optical element (scanning lens 6b) provided with the optical element-deforming unit has the largest refracting power in the sub-scanning direction in the scanning optical system. The scanning line curvature can be corrected more satisfactorily by providing the optical element-deforming unit in the optical element having a large refracting power in the sub-scanning direction to correct the scanning line curvature. Further, because the volume of deformation for the correction can be reduced, deterioration in an optical scanning performance due to the environmental variations generated by a distortion of the scanning lens due to a temperature change can be prevented. Because the optical element-deforming unit can have a simpler configuration, the apparatus can be downsized and low cost can be achieved.

The optical element-deforming unit can be formed so as to apply a force to the optical element in a direction parallel to the sub-scanning direction near the extreme value of the function Cs(y) positioned substantially at a central point in the main scanning direction. A schematic of this configuration is shown in FIG. 22.

Figure 22:
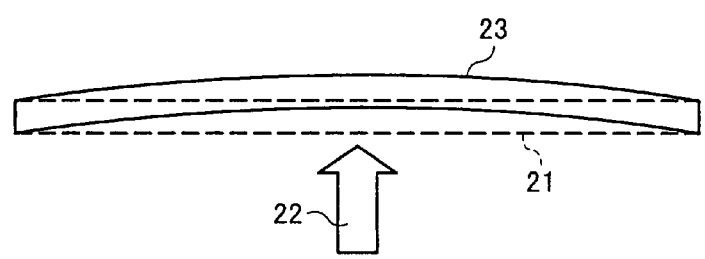
FIG. 22 is a schematic for explaining a pressurizing method using an optical element-deforming unit according to the fifth embodiment.

In FIG. 22, an optical element 21 shown by rectangular dotted line is pressurized and deformed in parallel to the sub-scanning direction at a pressurizing point shown by the arrow, by an optical element-deforming unit 22 having, for example, a configuration shown in FIG. 9. At this time, the optical element 21 is deformed in a parabolic form so as to have a shape of an optical element 23 after being deformed shown by the solid line. By adjusting the volume of deformation, the scanning line curvature in the optical scanning apparatus having the configuration according to the fifth embodiment can be corrected satisfactorily. In the optical element-deforming unit having pressurizing points at three positions as shown in FIG. 8, the optical element-deforming unit is combined with an optical element having three extreme values of the function Cs(y), and is configured so as to apply a force to near the coordinates of the three extreme values at the respective pressurizing points to deform the optical element. Accordingly, the scanning line curvature can be reduced further.

A deforming unit that deforms the optical element in a rotation direction can be also considered as an optical element-deforming method. However, in this case, the number of parts increases, thereby making the apparatus more complicated or causing a cost increase, and increasing the size of the apparatus. Further, due to the rotation of the optical surface, wave front of the beams is distorted, the beam spot diameter increases, and optical characteristics deteriorate. The configuration for linearly pressurizing the optical element in the sub-scanning direction can be simplified than in the case of the rotation deforming unit, thereby enabling scanning line curvature correction at a low cost.

Figure 23:
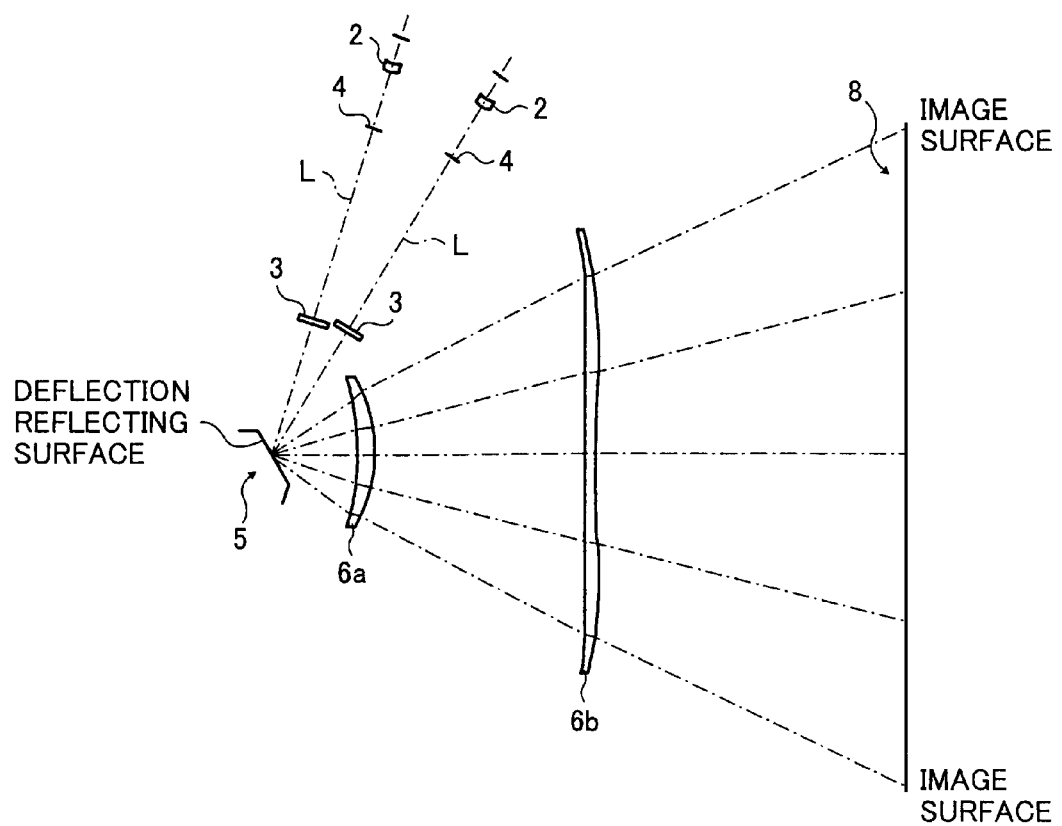
FIG. 23 is a schematic block diagram of a case having a plurality of light sources according to a sixth embodiment of the present invention.

FIG. 23 depicts a configuration of the scanning optical system in the optical scanning apparatus including a plurality of light sources as a sixth embodiment of the present invention. The scanning optical system respectively couples beams L from the light source (not shown) by a coupling lens 2 and an aperture 4 performs beam forming. The beams L are focused to near a deflection reflecting surface of the rotary polygon mirror 5 by the cylindrical lens 3 and optically scanned on an image surface, which is the surface 8 to be scanned, by the first scanning lens 6a and the second scanning lens 6b. Because there is a plurality of light sources, the scanning line can be formed at high speed by optical scanning, and an image can be formed at high speed.

However, when a plurality of light sources are used, a shape difference of the scanning lines between respective light sources appears as out-of-color registration or density differences in image forming, thereby causing degradation of image quality. Accordingly, reduction of the scanning line curvature is required for achieving high image quality, particularly when a plurality of light sources are used.

In the scanning optical system shown in FIG. 23, by forming the second scanning lens 6b in a shape satisfying the conditions in the first to fifth embodiments, the scanning line curvature can be reduced to enable high-speed and excellent optical scanning.

Furthermore, as the light source, a single light source that can emit a plurality of beams can be also used. For example, the light source can be the one in which a semiconductor laser array is arranged for two or more channels, and more preferably, a surface-emitting laser (vertical-cavity surface-emitting laser (VCSEL)) capable of emitting more beams, in which light emitting elements can be accumulated at a high density.

When the surface-emitting laser is used, the light emitting elements expand particularly in the sub-scanning direction. Therefore, it is necessary to reduce lateral magnification in the sub-scanning direction, and maintain uniform optical spot positions between image heights, and at the same time, a more strict performance is required for correction of the scanning line curvature. Accordingly, by adopting the configuration of the first to fifth embodiments, a scanning line curvature can be satisfactorily reduced, and even when the surface-emitting laser is used, optical scanning can be performed satisfactorily and at a higher speed.

Figure 24:
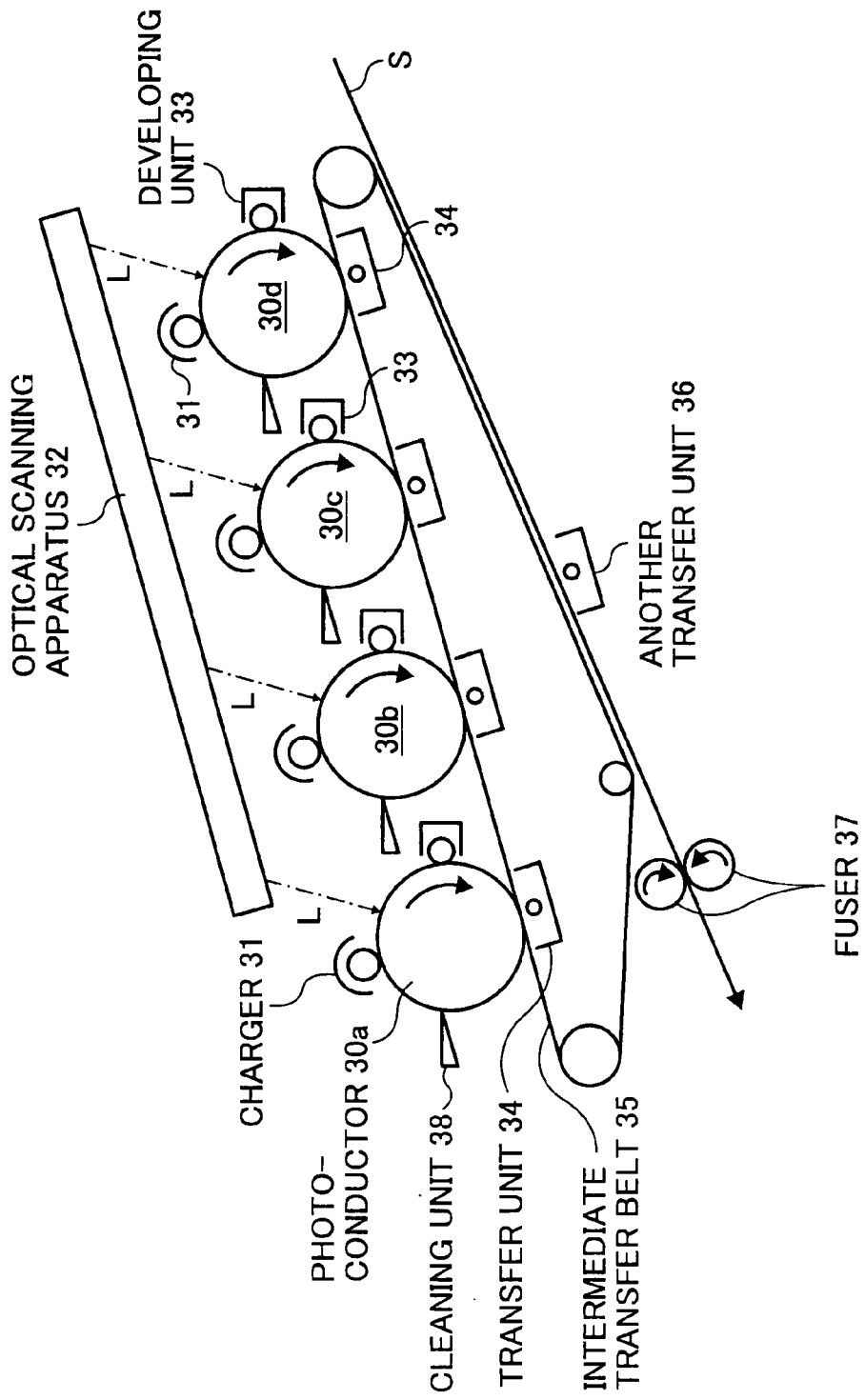
FIG. 24 is a schematic block diagram of an image forming apparatus according to the present invention.

FIG. 24 is a schematic block diagram for explaining an image forming apparatus according to the present invention.

In FIG. 24, photoconductors 30a to 30d installed corresponding to respective colors of cyan, magenta, yellow, and black rotate at equal velocity in a clockwise direction as shown by the arrow in FIG. 24. Each surface of the photoconductors 30a to 30d is uniformly charged by a charger 31. Thereafter, it is exposed and scanned upon reception of laser beams L emitted from an optical scanning apparatus 32 based on image data. An electrostatic latent image respectively written on the photoconductors 30a to 30d by the exposure is developed by a developing unit 33 and the electrostatic latent image is manifested as a toner image. The manifested images on the photoconductors 30a to 30d are sequentially transferred onto an intermediate transfer belt 35 by a transfer unit 34, thereby forming a full color image. The full color image is transferred onto a sheet recording medium S by another transfer unit 36, fixed by a fuser 37, and discharged to the outside of the apparatus.

Residual toner or paper dust on the photoconductors 30a to 30d is cleaned by a cleaning unit 38, and then charged again by the charger 31.

By incorporating the optical scanning apparatus of the first to fifth embodiments in a multi-color image forming apparatus, a scanning line curvature can be satisfactorily corrected for each optical scanning apparatus corresponding to each color. Accordingly, a full color image can be formed with high quality and less out-of-color registration, while achieving high speed, downsizing, and low cost, even if there are variations due to a manufacturing error.

According to the optical scanning apparatus of one aspect of the present invention, even if a manufacturing error occurs, a scanning line curvature occurs in a shape that can be easily corrected. Accordingly, the scanning line curvature can be corrected satisfactorily, thereby realizing a low-cost optical scanning apparatus having a high yield.

Furthermore, even in a downsized and low-cost full-color image forming apparatus having a high yield, high-quality full color images can be formed with less out-of-color registration.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning apparatus, comprising:
 a deflector that deflects to scan beams from a light source in a main scanning direction;

a scanning optical system that includes at least one optical element having a refracting power in a sub-scanning direction orthogonal to the main scanning direction and that images the beams on a surface to be scanned; and an optical element-deforming unit that deforms the at least one optical element so that a position of a center of curvature of the at least one optical element in the sub-scanning direction changes in a direction substantially parallel to the sub-scanning direction;

wherein a function Cs(y) of a curvature in the sub-scanning direction in a main scanning coordinate y on a generatrix of the scanning optical system on at least one surface, of optical surfaces included in the at least one optical element, is set to have only one extreme value within a mirror surface region of the at least one optical element.

2. The optical scanning apparatus of claim 1, wherein the at least one optical element is a transmission optical element, and wherein the at least one optical element is set such that the function Cs(y) has only one extreme value within the mirror surface region of the at least one optical element, on two optical surfaces included in the transmission optical element.

3. The optical scanning apparatus of claim 1, wherein the at least one surface of the at least one optical element is set such that a value of the function Cs(y) within the mirror surface region is less than or equal to $5.0 \times 10^{-3}$/mm.

4. The optical scanning apparatus of claim 1, wherein at least one pressurizing unit that applies force in the sub-scanning direction near a coordinate of the extreme value of the function Cs(y) of the at least one optical element in the main scanning direction is provided in the optical element-deforming unit.

5. An optical scanning apparatus, comprising:
a deflector that deflects to scan beams from a light source in a main scanning direction;
a scanning optical system that includes at least one optical element having a refracting power in a sub-scanning direction orthogonal to the main scanning direction and that images the beams on a surface to be scanned; and
an optical element-deforming unit that deforms the at least one optical element so that a position of a center of curvature of the at least one optical element in the sub-scanning direction changes in a direction substantially parallel to the sub-scanning direction;
wherein a function Cs(y) of a curvature in the sub-scanning direction in a main scanning coordinate y on a generatrix of the scanning optical system on at least one surface, of optical surfaces included in the optical element, is set to have three extreme values within a mirror surface region of the at least one optical element,
wherein the at least one optical element satisfies Equation (3):

$$1 > D/L > 0.82 \quad (3)$$

wherein L denotes the mirror surface region of the at least one optical element in the main scanning direction, and
wherein D denotes a distance in the main scanning direction of two extreme values, respectively closest to opposite ends of the mirror surface region, of the three extreme values.

6. The optical scanning apparatus of claim 5, wherein the at least one optical element is a transmission optical element, wherein the at least one optical element is set such that the function Cs(y) has three extreme values on two optical surfaces included in the transmission optical element, and wherein the two optical surfaces satisfy Equation (3).

7. The optical scanning apparatus of claim 5, wherein the at least one surface of the optical surfaces of the at least one optical element satisfies Equation (4):

$$1 > D/L > 0.90 \quad (4).$$

8. The optical scanning apparatus of claim 5, wherein the at least one surface of the at least one optical element is set such that a value of the function Cs(y) within the mirror surface region is less than or equal to $5.0 \times 10^{-3}$/mm.

9. The optical scanning apparatus of claim 5, wherein at least one pressurizing unit that applies force in the sub-scanning direction near a coordinate of the extreme values of the function Cs(y) of the at least one optical element in the main scanning direction is provided in the optical element-deforming unit.

10. An optical scanning apparatus, comprising:
a deflector that deflects to scan beams from a light source in a main scanning direction;
a scanning optical system that includes at least one optical element having a refracting power in a sub-scanning direction orthogonal to the main scanning direction and that images the beams on a surface to be scanned; and
an optical element-deforming unit that deforms the at least one optical element so that a position of a center of curvature of the at least one optical element in the sub-scanning direction changes in a direction substantially parallel to the sub-scanning direction;
wherein a function Cs(y) of a curvature in the sub-scanning direction in a main scanning coordinate y on a generatrix of the scanning optical system on at least one surface, of optical surfaces included in the at least one optical element, is set to satisfy Equation (5) or an approximation of Equation (5) within a mirror surface region of the at least one optical element:

$$Cs(y) = A + b_1 \cdot y + b_2 \cdot y^2 + b_3 \cdot y^3 + b_4 \cdot y^4 + \ldots \quad (5)$$

wherein A is a constant equal to Cs(0), with units of millimeters$^{-1}$, and
wherein a coefficient $b_x$, which is not $b_x = 0$ (x = integer from 1 to n), satisfies a relationship of $\log(|b_x/b_2|) < 2 \cdot (2-x)$.

11. The optical scanning apparatus of claim 10, wherein the at least one optical element is a transmission optical element, and wherein the at least one optical element is set such that the function Cs(y) satisfies Equation (5) on two optical surfaces included in the transmission optical element.

12. The optical scanning apparatus of claim 10, wherein the at least one surface of the at least one optical element is set such that a value of the function Cs(y) within the mirror surface region is less than or equal to $5.0 \times 10^{-3}$/mm.

13. The optical scanning apparatus of claim 10, wherein at least one pressurizing unit that applies force in the sub-scanning direction near a coordinate of an extreme value or extreme values of the function Cs(y) of the at least one optical element in the main scanning direction is provided in the optical element-deforming unit.

14. An optical scanning apparatus, comprising:
a deflector that deflects to scan beams from a light source in a main scanning direction;
a scanning optical system that includes at least one optical element having a refracting power in a sub-scanning direction orthogonal to the main scanning direction and that images the beams on a surface to be scanned; and an optical element-deforming unit that deforms the at least one optical element so that a position of a center of curvature of the at least one optical element in the sub-scanning direction changes in a direction substantially parallel to the sub-scanning direction;

wherein the at least one optical element is a transmission optical element having two optical surfaces, wherein the at least one optical element is set such that when one of the optical surfaces is relatively and eccentrically moved to the other one of the optical surfaces, a scanning line formed of optical spots on the surface to be scanned has only one extreme value of a function $Cs(y)$, wherein $Cs(y)$ is defined by Equation (5):

$$Cs(y)=A+b_1\cdot y+b_2\cdot y^2+b_3\cdot y^3+b_4\cdot y^4+\ldots \quad (5)$$

wherein A is a constant equal to $Cs(0)$, with units of millimeters$^{-1}$, and wherein a coefficient $b_x$, which is not $b_x=0$ (x=integer from 1 to n), satisfies a relationship of $\log(|b_x/b_2|)<2\cdot(2-x)$.

15. The optical scanning apparatus of claim 14, wherein at least one surface of the at least one optical element is set such that a value of the function $Cs(y)$ within a mirror surface region of the at least one optical element is less than or equal to $5.0\times10^{-3}$/mm.

16. The optical scanning apparatus of claim 14, wherein at least one pressurizing unit that applies force in the sub-scanning direction near a coordinate of the extreme value of the function $Cs(y)$ of the at least one optical element in the main scanning direction is provided in the optical element-deforming unit.

17. An image forming apparatus, comprising:
at least one image carrier; and
the optical scanning apparatus of claim 1, provided relative to the at least one image carrier;
wherein the optical scanning apparatus forms an image by performing optical scanning relative to the at least one image carrier.

18. An image forming apparatus, comprising:
at least one image carrier; and
the optical scanning apparatus of claim 5, provided relative to the at least one image carrier;
wherein the optical scanning apparatus forms an image by performing optical scanning relative to the at least one image carrier.

19. An image forming apparatus, comprising:
at least one image carrier; and
the optical scanning apparatus of claim 10, provided relative to the at least one image carrier;
wherein the optical scanning apparatus forms an image by performing optical scanning relative to the at least one image carrier.

20. An image forming apparatus, comprising:
at least one image carrier; and
the optical scanning apparatus of claim 14, provided relative to the at least one image carrier;
wherein the optical scanning apparatus forms an image by performing optical scanning relative to the at least one image carrier.

* * * * *